(12) United States Patent
Luong

(10) Patent No.: US 11,350,057 B2
(45) Date of Patent: May 31, 2022

(54) SOLID-STATE IMAGING ELEMENT, IMAGING APPARATUS, AND METHOD FOR CONTROLLING SOLID-STATE IMAGING ELEMENT

(71) Applicant: Sony Semiconductor Solutions Corporation, Kanagawa (JP)

(72) Inventor: Hung Luong, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/968,199

(22) PCT Filed: Dec. 4, 2018

(86) PCT No.: PCT/JP2018/044526
§ 371 (c)(1),
(2) Date: Aug. 7, 2020

(87) PCT Pub. No.: WO2019/159499
PCT Pub. Date: Aug. 22, 2019

(65) Prior Publication Data
US 2021/0044772 A1      Feb. 11, 2021

(30) Foreign Application Priority Data

Feb. 15, 2018   (JP) .............................. JP2018-024873

(51) Int. Cl.
*H04N 5/378* (2011.01)
*H04N 5/3745* (2011.01)
(52) U.S. Cl.
CPC ......... *H04N 5/378* (2013.01); *H04N 5/37457* (2013.01)

(58) Field of Classification Search
CPC .... H04N 5/378; H04N 5/37457; H04N 5/363; H04N 5/3575
See application file for complete search history.

(56) References Cited

U.S. PATENT DOCUMENTS

| 5,949,483 | A  | * | 9/1999  | Fossum   | H04N 5/3575 348/303 |
| 8,890,987 | B2 | * | 11/2014 | Eshel    | H04N 5/3575 348/300 |
| 2009/0309033 | A1 | * | 12/2009 | Cho      | H04N 5/378 250/370.08 |
| 2014/0014817 | A1 | * | 1/2014  | Motonaga | H04N 5/378 250/208.1 |

* cited by examiner

*Primary Examiner* — Nhan T Tran
(74) *Attorney, Agent, or Firm* — Michael Best & Friedrich LLP

(57) ABSTRACT

To improve an SN ratio in a solid-state imaging element provided with a capacitance for reducing a noise component. A first capacitance connection circuit connects one end of a first capacitance to a first signal line in a case where a first pixel signal is transmitted via the first signal line. A second capacitance connection circuit connects one end of a second capacitance to a second signal line in a case where a second pixel signal is transmitted via the second signal line. An intercapacitance connection circuit connects one end of each of the first capacitance and the second capacitance in a case where one of the first pixel signal and the second pixel signal is transmitted, and disconnects one end of each of the first capacitance and the second capacitance in a case where both the first pixel signal and the second pixel signal are transmitted.

15 Claims, 23 Drawing Sheets

SOLID-STATE IMAGING ELEMENT, IMAGING APPARATUS, AND METHOD FOR CONTROLLING SOLID-STATE IMAGING ELEMENT

TECHNICAL FIELD

The present technology relates to a solid-state imaging element, an imaging apparatus, and a method for controlling a solid-state imaging element. More specifically, the present technology relates to a solid-state imaging element in which an analog-to-digital converter is arranged for each column, an imaging apparatus, and a method for controlling the solid-state imaging element.

BACKGROUND ART

Conventionally, in a solid-state imaging element, a column analog-to-digital converter (ADC) system in which an ADC is arranged for each column of pixels has been widely used. In this column ADC system, a sample-hold circuit that samples a pixel signal and holds the signal over a conversion period is often arranged at a stage preceding the ADC for each column. Here, in the process of sampling and holding the pixel signal by the sample-hold circuit, kTC noise is generated due to the on/off of a switch in the circuit. Furthermore, in the pixel circuit preceding the sample-hold circuit, 1/f noise occurs in a small-sized pixel amplifier transistor. These noise components deteriorate the signal-noise (SN) ratio of the pixel signal. Therefore, a solid-state imaging element in which a capacitance for reducing a noise component is provided in a sample-hold circuit has been proposed (for example, see Patent Document 1).

CITATION LIST

Patent Document

Patent Document 1: U.S. Pat. No. 8,890,987

SUMMARY OF THE INVENTION

Problems to be Solved by the Invention

In the above-described conventional technology, the SN ratio can be improved to a target value or more by holding the noise component in the capacitance and reducing the noise component for a certain time corresponding to the frame rate. However, in a case where the level of the noise component is high, the SN ratio may not reach the target value even if the noise component is reduced by the capacitance. When the time for which the capacitance holds the noise component is made longer, the noise component can be further reduced, but it is difficult to secure the operating point of the sample-hold circuit, which is not desirable. Furthermore, even if the problem of securing the operating point can be solved by increasing the capacitance value, the circuit area increases, which is not preferable.

The present technology has been made in view of such a situation, and it is an object of the present technology to improve an SN ratio in a solid-state imaging element provided with a capacitance for reducing a noise component.

Solutions to Problems

The present technology is made to solve the aforementioned problems, and a first aspect thereof as a solid-state imaging element including: a first capacitance; a second capacitance; a first capacitance connection circuit configured to connect one end of the first capacitance to a first signal line in a case where a first pixel signal is transmitted via the first signal line; a second capacitance connection circuit configured to connect one end of the second capacitance to a second signal line in a case where a second pixel signal is transmitted via the second signal line; and an intercapacitance connection circuit configured to connect the one end of each of the first capacitance and the second capacitance in a case where one of the first pixel signal and the second pixel signal is transmitted and disconnect the one end of each of the first capacitance and the second capacitance in a case where both of the first pixel signal and the second pixel signal are transmitted, and a method for controlling the solid-state imaging element. Therefore, an effect that in a case where one of the first pixel signal and the second pixel signal is transmitted, a plurality of capacitances is connected in parallel to one of the signal lines is provided.

Furthermore, the first aspect may further include a first sample-hold amplifier circuit configured to sample and hold the first pixel signal, amplify the held first pixel signal, and output the amplified first pixel signal via the first signal line; and a second sample-hold amplifier circuit configured to sample and hold the second pixel signal, amplify the held second pixel signal, and output the amplified second pixel signal via the second signal line. Therefore, an effect that the first pixel signal and the second pixel signal are sampled and held is provided.

Furthermore, in the first aspect, every time one of a plurality of rows each including a predetermined number of pixels arranged in a predetermined direction is selected, one of the first sample-hold amplifier circuit and the second sample-hold amplifier circuit may output one of the first pixel signal and the second pixel signal. Therefore, an effect that every time a row is selected, one of the first pixel signal and the second pixel signal is output is provided.

Furthermore, in the first aspect, in a case where the first sample-hold amplifier circuit samples the first pixel signal, the second sample-hold amplifier circuit may hold the second pixel signal, and in a case where the first sample-hold amplifier circuit holds the first pixel signal, the second sample-hold amplifier circuit may sample the second pixel signal. Therefore, an effect that one of the first pixel signal and the second pixel signal is sampled and the other is held is provided.

Furthermore, in the first aspect, each of the first pixel signal and the second pixel signal may include a reset level and a signal level. Therefore, an effect that the signal level and the reset level are sampled is provided.

Furthermore, in the first aspect, the first sample-hold amplifier circuit and the second sample-hold amplifier circuit may be provided in pairs, in a case where one of the pair of first sample-hold amplifier circuits samples the reset level of the first pixel signal, the other of the pair of first sample-hold amplifier circuits may hold the signal level of the first pixel signal, and in a case where one of the pair of first sample-hold amplifier circuits holds the reset level of the first pixel signal, the other of the pair of first sample-hold amplifier circuits may sample the signal level of the first pixel signal, and in a case where one of the pair of second sample-hold amplifier circuits samples the reset level of the second pixel signal, the other of the pair of second sample-hold amplifier circuits may hold the signal level of the second pixel signal, and in a case where one of the pair of second sample-hold amplifier circuits holds the reset level of the second pixel signal, the other of the pair of second sample-hold amplifier circuits may sample the signal level of the second pixel signal. Therefore, an effect that one of the reset level and the signal level is sampled and the other is held is provided.

Furthermore, in the first aspect, the first sample-hold amplifier circuit and the second sample-hold amplifier circuit may be provided in pairs, the pair of first sample-hold amplifier circuits may sequentially sample the reset level and the signal level of the first pixel signal, and the pair of second sample-hold amplifier circuits may sequentially sample the reset level and the signal level of the second pixel signal. Therefore, an effect that one of the first pixel signal and the second pixel signal is sampled and the other is held is provided.

Furthermore, in the first aspect, four first sample-hold amplifier circuits and four second sample-hold amplifier circuits may be provided, in a case where two of the four first sample-hold amplifier circuits sequentially sample the reset level and the signal level of the first pixel signal, the remaining first sample-hold amplifier circuits may hold the reset level and the signal level of the first pixel signal, and in a case where two of the four second sample-hold amplifier circuits sequentially sample the reset level and the signal level of the second pixel signal, the remaining second sample-hold amplifier circuits may hold the reset level and the signal level of the second pixel signal. Therefore, an effect that one of pixel signals of a certain row is sampled and a pixel signal of another row is held is provided.

Furthermore, a second aspect of the present technology is an imaging apparatus including: first capacitance; a second capacitance; a first capacitance connection circuit configured to connect one end of the first capacitance to a first signal line in a case where a first pixel signal is transmitted via the first signal line; a second capacitance connection circuit configured to connect one end of the second capacitance to a second signal line in a case where a second pixel signal is transmitted via the second signal line; an intercapacitance connection circuit configured to connect the one end of each of the first capacitance and the second capacitance in a case where one of the first pixel signal and the second pixel signal is transmitted and disconnect the one end of each of the first capacitance and the second capacitance in a case where both of the first pixel signal and the second pixel signal are transmitted; and a signal processing unit configured to perform predetermined signal processing on the first pixel signal and the second pixel signal. Therefore, an effect that in a case where one of the first pixel signal and the second pixel signal is transmitted, a plurality of capacitances is connected in parallel to one of the signal lines and signal processing is performed is provided.

Effects of the Invention

According to the present technology, an excellent effect of increasing the read speed while reducing the noise component can be obtained. Note that effects described herein are not necessarily limited, but may also be any of those described in the present disclosure.

MODE FOR CARRYING OUT THE INVENTION

Modes for carrying out the present technology (hereinafter, the embodiments) are described below. A description is given in the order described below.

1. First embodiment (example of connecting a plurality of capacitances in parallel)
2. Second embodiment (example in which a plurality of capacitances is connected in parallel and read sequentially one by one)
3. Third embodiment (example in which a plurality of capacitances is connected in parallel and a difference between a reset level and a signal level is determined)
4. Application examples to mobile objects 1. First Embodiment

[Configuration Example of Imaging Apparatus]

Figure 1:
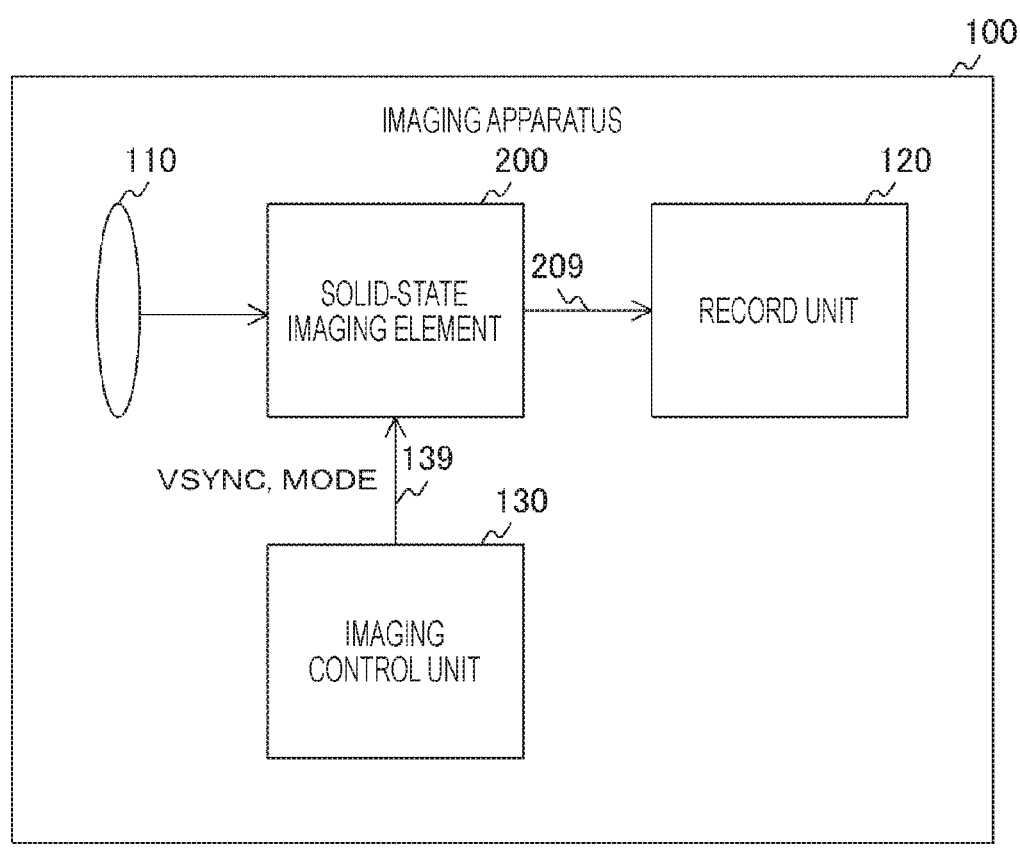
FIG. 1 is a block diagram illustrating a configuration example of an imaging apparatus according to a first embodiment of the present technology.

FIG. 1 is a block diagram illustrating a configuration example of an imaging apparatus 100 according to the first embodiment of the present technology. The imaging apparatus 100 is an apparatus that captures image data, and includes an imaging lens 110, a solid-state imaging element 200, a record unit 120, and an imaging control unit 130. As the imaging apparatus 100, a digital camera such as an IoT camera or an electronic apparatus (e.g., a smartphone or a personal computer) having an imaging function is assumed.

The solid-state imaging element 200 captures image data under the control of the imaging control unit 130. The solid-state imaging element 200 supplies the image data to the record unit 120 via a signal line 209.

The imaging lens 110 collects light and guides the collected light to the solid-state imaging element 200. The imaging control unit 130 causes the solid-state imaging element 200 to capture image data. The imaging control unit 130 supplies, for example, an imaging control signal including a mode signal MODE and a vertical synchronization signal VSYNC to the solid-state imaging element 200 via a signal line 139. The record unit 120 records the image data.

Here, the mode signal MODE is a signal indicating one of the normal mode and the decimation mode. Among these, the normal mode is a mode in which the solid-state imaging element 200 captures the image data without decimating pixels. On the other hand, the decimation mode is a mode in which the solid-state imaging element 200 decimates pixels and captures image data having a smaller number of pixels than in the normal mode. Furthermore, the vertical synchronization signal VSYNC is a signal indicating the timing of imaging, and a periodic signal having a fixed frequency (e.g., 60 Hertz) is used as the vertical synchronization signal VSYNC.

Note that, although the imaging apparatus 100 records image data, the image data may be transmitted to the outside of the imaging apparatus 100. In this case, an external interface for transmitting the image data is further provided. Alternatively, the imaging apparatus 100 may further display the image data. In this case, a display unit is further provided.

[Configuration Example of Solid-State Imaging Element]

Figure 2:
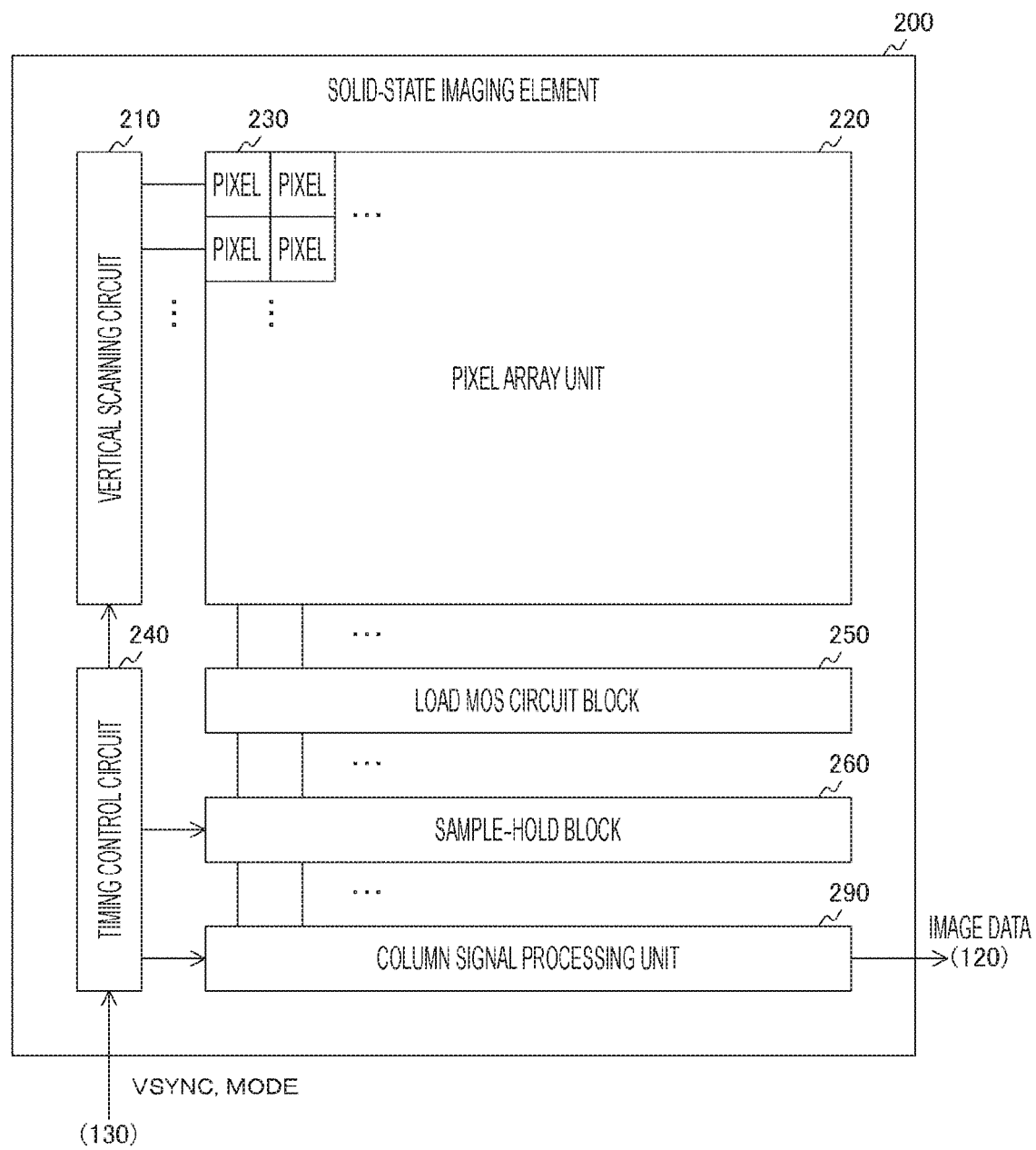
FIG. 2 is a block diagram illustrating a configuration example of a solid-state imaging element according to the first embodiment of the present technology.

FIG. 2 is a block diagram illustrating a configuration example of the solid-state imaging element 200 according to the first embodiment of the present technology. The solid-state imaging element 200 includes a vertical scanning circuit 210, a pixel array unit 220, a timing control circuit 240, a load MOS circuit block 250, a sample-hold block 260, and a column signal processing unit 290. In the pixel array unit 220, a plurality of pixels 230 is arranged in a two-dimensional lattice shape.

Hereinafter, a set of pixels 230 arranged in a horizontal direction is referred to as a "row", and a set of pixels 230 arranged in a direction perpendicular to the row is referred to as a "column".

The timing control circuit 240 controls the operation timing of each of the vertical scanning circuit 210, the sample-hold block 260, and the column signal processing unit 290 in synchronization with the vertical synchronization VSYNC from the imaging control unit 130. Furthermore, the mode signal MODE from the imaging control unit 130 is also input to the timing control circuit 240. Then, the timing control circuit 240 changes the operation timing depending on the mode indicated by the mode signal MODE.

The vertical scanning circuit 210 sequentially selects and drives the rows, and outputs an analog pixel signal. The pixel 230 generates an analog pixel signal by photoelectrically converting incident light. The pixel 230 supplies the pixel signal to the sample-hold block 260 via the load MOS circuit block 250.

In the load MOS circuit block 250, a MOS transistor for supplying a constant current is provided for each column. The sample-hold block 260 is provided with the sample-hold circuit for sampling and holding the pixel signal with respect to each column. These sample-hold circuits amplify the held pixel signals and supply the amplified pixel signals to the column signal processing unit 290.

The column signal processing unit 290 executes signal processing such as AD conversion processing on pixel signals with respect to each column. The column signal processing unit 290 supplies image data including the processed signal to the record unit 120. Note that the column signal processing unit 290 is an example of the signal processing unit described in the claims.

[Configuration Example of the Pixel]

Figure 3:
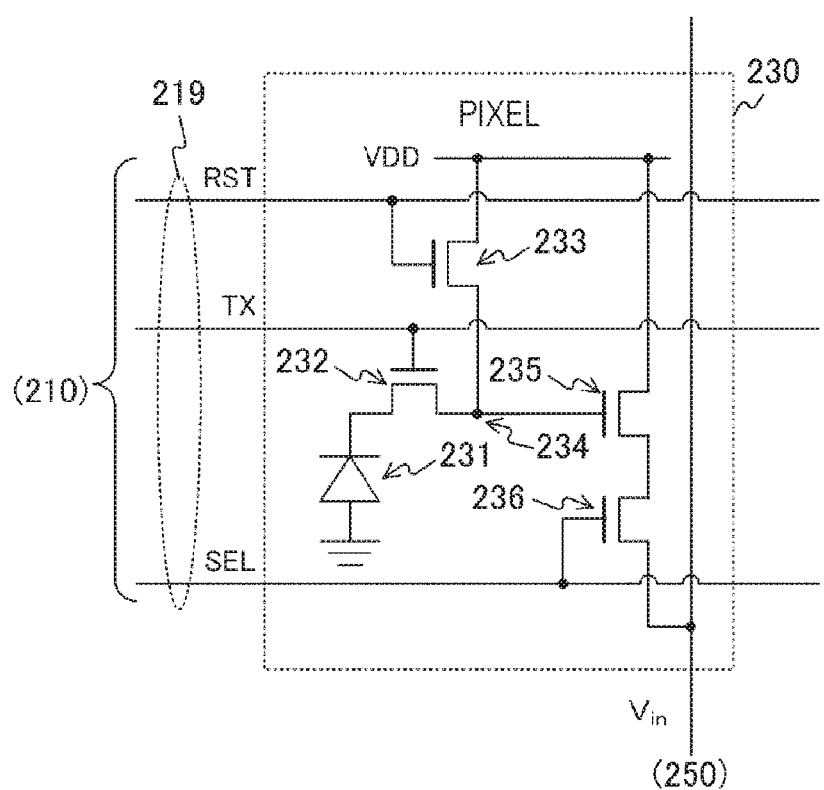
FIG. 3 is a circuit diagram illustrating a configuration example of a pixel according to the first embodiment of the present technology.

FIG. 3 is a circuit diagram illustrating a configuration example of the pixel 230 according to the first embodiment of the present technology. The pixel 230 includes a photodiode 231, a transfer transistor 232, a reset transistor 233, a floating diffusion layer 234, an amplification transistor 235, and a selection transistor 236.

The photodiode 231 photoelectrically converts incident light and generates charges. The transfer transistor 232 transfers charges from the photodiode 231 to the floating diffusion layer 234 according to a transfer signal TX from the vertical scanning circuit 210. The reset transistor 233 initializes the charge amount of the floating diffusion layer 234 according to a reset signal RST from the vertical scanning circuit 210. The floating diffusion layer 234 accumulates charges and generates a voltage corresponding to the charge amount.

The amplification transistor 235 amplifies the signal of the voltage of the floating diffusion layer 234. The selection transistor 236 outputs the amplified signal as a pixel signal to the load MOS circuit block 250 via a vertical signal line according to the selection signal SEE from the vertical scanning circuit 210. This pixel signal is input to the sample-hold block 260 via the load MOS circuit block 250 as an input signal $V_{in}$.

Note that the circuit of the pixel 230 is not limited to the configuration illustrated in the drawing as long as it can generate a pixel signal by photoelectric conversion.

Figure 4:
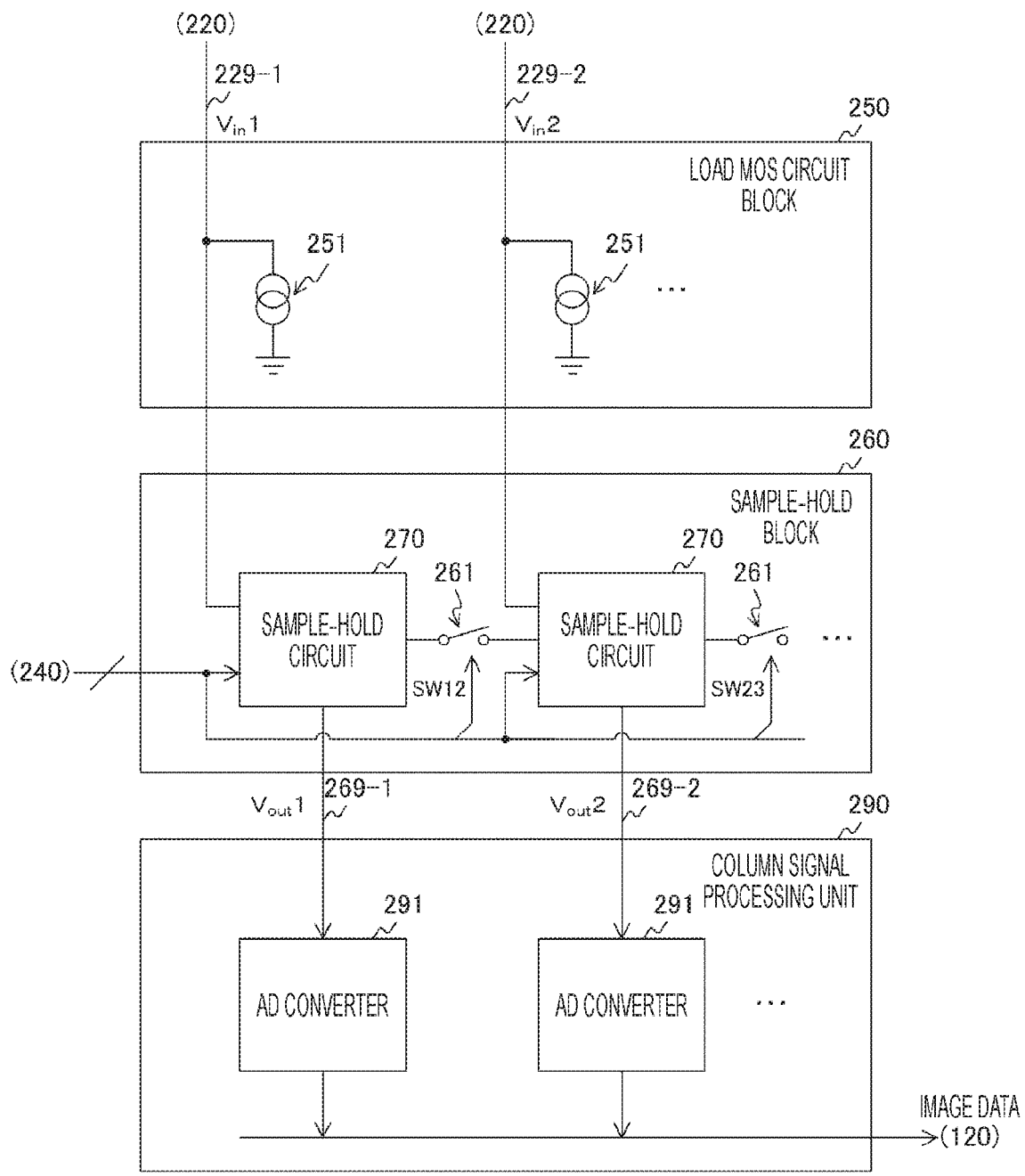
FIG. 4 is a block diagram illustrating a configuration example of a load metal-oxide-semiconductor (MOS) circuit block, a sample-hold block, and a column signal processing unit according to the first embodiment of the present technology.

FIG. 4 is a block diagram illustrating a configuration example of the load MOS circuit block 250, the sample-hold block 260, and the column signal processing unit 290 according to the first embodiment of the present technology.

In the load MOS circuit block 250, a vertical signal line is wired with respect to each column. Assuming that the number of columns is M, M vertical signal lines are wired. In the m (m is an integer of 1 to M)-th column, a vertical signal line 229-*m* is wired. Furthermore, a load MOS circuit 251 for supplying a constant current is connected to each of the vertical signal lines 229-*m*. Then, an input signal $V_{in}$m is transmitted via the vertical signal line 229-*m*.

In the sample-hold block 260, the sample-hold circuit 270 is arranged with respect to each column. Furthermore, a switch 261 is arranged between two adjacent sample-hold circuits 270. Assuming that the number of columns is M, M sample-hold circuits 270 and M−1 switches 261 are arranged. Furthermore, the vertical signal line 229-*m* is connected to an input terminal of the sample-hold circuit 270 of the m-th column, and the vertical signal line 269-*m* is connected to an output terminal.

The sample-hold circuit 270 samples and holds the input signal $V_{in}$m (pixel signal), and outputs it as an output signal $V_{out}$m via the vertical signal line 269-*m*. Furthermore, each of the sample-hold circuits 270 is provided with a capacitance for reducing a noise component. The location of this capacitance will be described later.

The switch 261 opens and closes a path between one end of the capacitance in the sample-hold circuit 270 of the m-th column and one end of the capacitance of the sample-hold circuit 270 of the m+1-th column. The switch 261 shifts to an ON state or an OFF state and opens and closes the path according to a control signal SWm(m+1) from the timing control circuit 240. For example, in a case where the control signal SWm (m+1) is at a high level, the switch 261 shifts to an ON state to bring the path into a closed state, and in a case where it is at a low level, the switch 261 shifts to an OFF state to bring the path into an open state. The opening/closing timing of the switch 261 will be described later.

The column signal processing unit 290 includes an analog-to-digital (AD) converter 291 with respect to each column. Assuming that the number of columns is N, M AD converters 291 are arranged. The AD converter 291 converts an analog output signal $V_{out}$m transmitted via the vertical signal line 269-*m* into a digital signal. The image data including the converted digital signal is supplied to the record unit 120.

[Configuration Example of the Sample-Hold Circuit]

Figure 5:
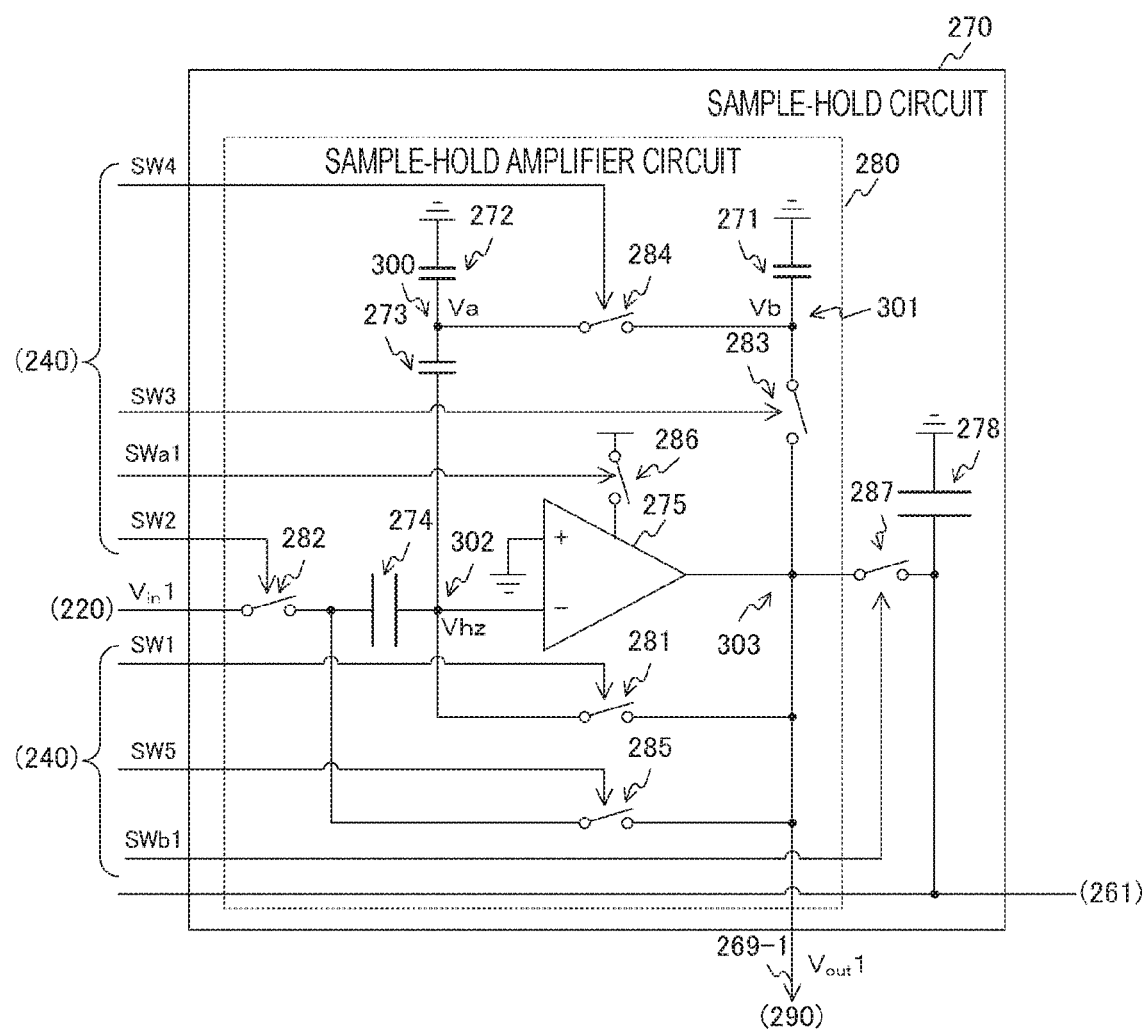
FIG. 5 is a circuit diagram illustrating a configuration example of the sample-hold circuit according to the first embodiment of the present technology.

FIG. 5 is a circuit diagram illustrating a configuration example of the sample-hold circuit 270 according to the first embodiment of the present technology. The sample-hold circuit 270 includes a sample-hold amplifier circuit 280, a switch 287, and a capacitance 278.

The sample-hold amplifier circuit 280 samples and holds the input signal $V_{in}$m, amplifies it, and outputs it as an output signal $V_{out}$m. This sample-hold amplifier circuit 280 includes capacitances 271 to 274, an amplifier 275, and switches 281 to 286.

The switch 282 samples the input signal $V_{in}$m according to a control signal SW2 from the timing control circuit 240 and supplies the sampled signal to the capacitance 274. For example, in a case where the control signal SW2 is at a high level, the switch 282 shifts to an ON state to supply the input signal $V_{in}$m to the capacitance 274, and in a case where it is at a low level, the switch 282 shifts to an OFF state to stop supply of the input signal $V_{in}$m.

The capacitance 274 holds the sampled signal. One end of the capacitance 274 is connected to the switch 282, and the other end is connected to an inverting input terminal (−) of the amplifier 275.

The switch 281 short-circuits the inverting input terminal (−) and the output terminal of the amplifier 275 according to the control signal SW1 from the timing control circuit 240. For example, in a case where the control signal SW1 is at a high level, the switch 281 shifts to an ON state to short-circuit the terminals, and in a case where it is at a low level, the switch 281 shifts to an OFF state.

The switch 284 connects the inverting input terminal (−) and the output terminal of the amplifier 275 via the capacitance 273 and the switch 283 according to the control signal SW4 from the timing control circuit 240. The capacitance 273 is inserted between one end of the switch 284 and the inverting input terminal (−) of the amplifier 275, and the switch 283 is inserted between the other end of the switch 284 and the output terminal of the amplifier 275. For example, in a case where the control signal SW4 is at a high level, the switch 284 shifts to an ON state to connect the terminals, and in a case where it is at a low level, the switch 284 shifts to an OFF state.

The switch 283 connects the capacitance 271 to the output terminal of the amplifier 275 according to the control signal SW3 from the timing control circuit 240. For example, in a case where the control signal SW3 is at a high level, the switch 283 shifts to an ON state to connect the capacitance 271, and in a case where it is at a low level, the switch 283 shifts to an OFF state to disconnect the capacitance 271.

One end of the capacitance 272 is connected to one end of the switch 284, and the other end is connected to a ground terminal.

The switch 285 short-circuits a node between the switch 282 and the capacitance 274 and the output terminal of the amplifier 275 according to the control signal SW5 from the timing control circuit 240. For example, in a case where the control signal SW5 is at a high level, the switch 285 shifts to an ON state to short-circuit the node and the like, and in a case where it is at a low level, the switch 285 shifts to an OFF state.

The switch 286 supplies power to the amplifier 275 of the m-th column according to the control signal SWam from the timing control circuit 240. For example, in a case where the control signal SWam is at a high level, the switch 286 shifts to an ON state to supply power, and in a case where it is at a low level, the switch 286 shifts to an OFF state to stop supply of power.

The amplifier 275 amplifies the input signal. The non-inverting input terminal (+) of the amplifier 275 is connected to the ground terminal, and the output terminal is connected to the vertical signal line 269-*m*, The output signal $V_{out}$m is transmitted via the vertical signal line 269-*m*.

The switch 287 connects one end of the capacitance 278 to the vertical signal line 269-*m* according to the control signal SWbm from the timing control circuit 240. For example, in a case where the control signal SWbm is at a high level, the switch 287 shifts to an ON state to connect the capacitance 278, and in a case where it is at a low level, the switch 287 shifts to an OFF state to disconnect the capacitance 278.

The capacitance 278 is a capacitance used for removing a noise component included in the output signal $V_{out}$m (pixel signal).

The potential of a node 300 between the capacitances 272 and 273 is Va, and the potential of a node 301 between the capacitance 271 and the switch 283 is Vb. Furthermore, the potential of a node 302 between the capacitance 274 and the inverting input terminal (−) of the amplifier 275 is Vhz. Furthermore, the potential of a node 303 of the output terminal of the amplifier 275 is the potential of the output signal $V_{out}$m.

Under the control of the switches 281 to 285 by the timing control circuit 240, the input signal in is sampled and held in the capacitance 274. Furthermore, the capacitance 278 removes a noise component. In order to sufficiently remove the noise component, it is necessary for the timing control circuit 240 to control the amplifier 275 to an open loop state for a fixed time after sampling. The longer this time is, the higher the effect of reducing the noise component is. The period during which the amplifier 275 is in the open loop state is hereinafter referred to as "noise accumulation time".

The longer the noise accumulation time, the more the SN ratio can be improved. However, when the noise accumulation time is longer, it becomes difficult to secure the operating point of the sample-hold circuit 270, and therefore it is not preferable to increase the noise accumulation time. Furthermore, even if the object of securing the operating point can be achieved by increasing the capacitance value of the capacitance 278 of each column while keeping the noise accumulation time constant, when the individual capacitance values of the capacitances 278 are increased, there is a possibility that the entire circuit area and circuit scale of the solid-state imaging element 200 increase, which is not preferable.

Therefore, in the solid-state imaging element 200, in the decimation mode, the plurality of capacitances 278 is connected to the vertical signal line 269-m in parallel by controlling the switch 261 between the adjacent capacitances 278 to a closed state. For example, the timing control circuit 240 controls the switch 261 between a 3k (k is an integer)+1-th column and a 3k+2-th column and the switch 261 between the 3k+2-th column and the 3k-th column to an ON state. Furthermore, the switch 261 between the 3k-th column and the 3k+1-th column is controlled to an OFF state. With this control, three capacitances 278 are connected in parallel to the vertical signal line 269-(3k−1), and the capacitance value per signal line can be tripled to improve the SN ratio.

Figure 6:
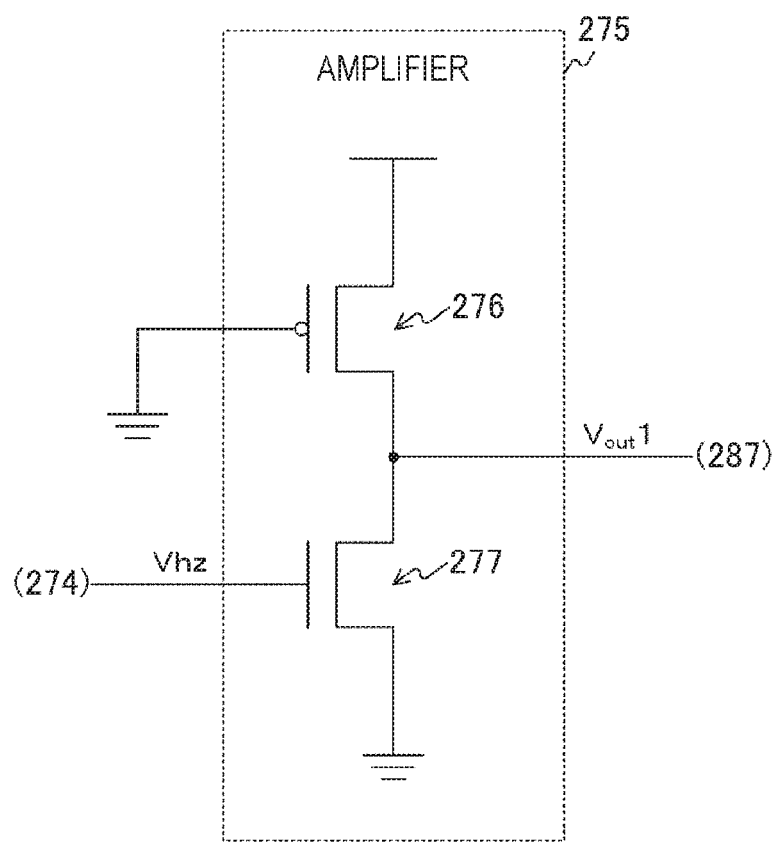
FIG. 6 is a circuit diagram illustrating a configuration example of an amplifier according to the first embodiment of the present technology.

FIG. 6 is a circuit diagram illustrating a configuration example of the amplifier 275 according to the first embodiment of the present technology. This amplifier 275 includes a P-type transistor 276 and an N-type transistor 277. These P-type transistor 276 and N-type transistor 277 are connected in series between a power supply terminal and a ground terminal. As the transistor, for example, a MOS transistor is used.

Furthermore, a gate of the P-type transistor 276 is connected to the ground terminal via the non-inverting input terminal (+) of the amplifier 275. On the other hand, a gate of the N-type transistor 277 is connected to the capacitance 274 and the like via the inverting input terminal (−) of the amplifier 275. Furthermore, a connection point between the P-type transistor 276 and the N-type transistor 277 is connected to the switch 287 and the like via the output terminal of the amplifier 275. Therefore, the input signal of the potential Vhz is amplified with a constant gain and output as the output signal $V_{out}$m.

[Operation Example of the Solid-State Imaging Element]

Figure 7:
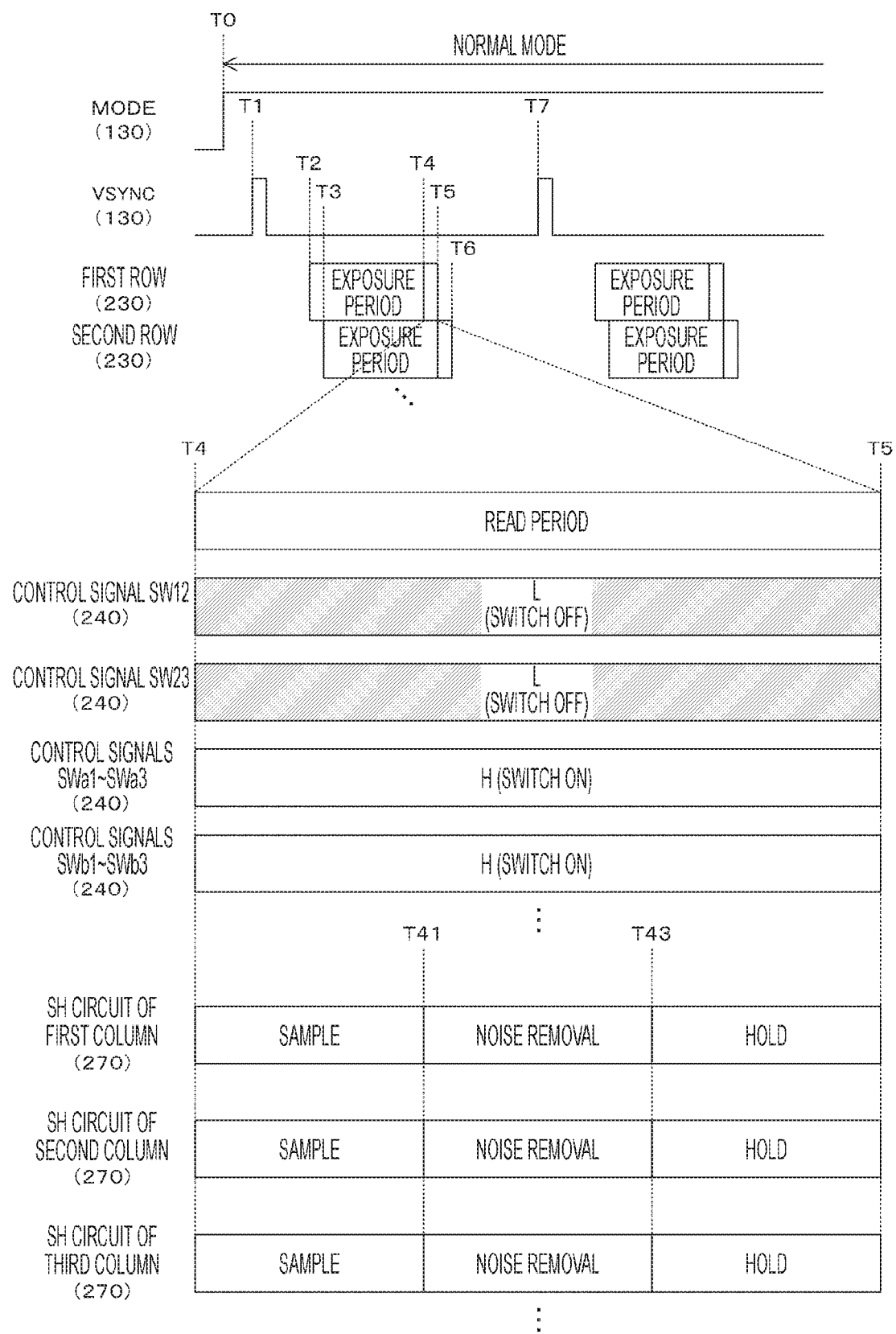
FIG. 7 is a timing chart illustrating an example of an operation of the solid-state imaging element when a normal mode is set according to the first embodiment of the present technology.

FIG. 7 is a timing chart illustrating an example of an operation of the solid-state imaging element 200 when a normal mode is set according to the first embodiment of the present technology. For example, it is assumed that the imaging control unit 130 has set the normal mode according to the mode signal MODE at timing T0. In the normal mode, the imaging control unit 130 supplies the vertical synchronization signal VSYNC at a constant cycle. This vertical synchronization signal VSYNC is controlled to a high level over a predetermined pulse period from timing T1 after the timing T0. Furthermore, the vertical synchronization signal VSYNC is controlled to a high level from timing T7 over a pulse period. Thereafter, every time a predetermined period elapses, the vertical synchronization signal VSYNC is supplied over the pulse period.

The vertical scanning circuit 210 drives the pixels 230 of a first row to start exposure at timing T2 within the cycle of the vertical synchronziation signal VSYNC. Then, the vertical scanning circuit 210 ends the exposure of the first row at timing T4 at which a fixed exposure period has elapsed from the timing T2, and outputs a pixel signal.

Furthermore, the vertical scanning circuit 210 starts the exposure of a second row at timing T3 after the timing T2, and ends the exposure of the second row at timing T5 at which the exposure period has elapsed. Similarly, third and subsequent rows are sequentially exposed.

On the other hand, the timing control circuit 240 sets SWm(m+1) low level (L) of the control signals SW12 and 23 and the like over a period from timing T4 to the timing T5 at which a certain readout period elapses, and sets all the switches 261 between the capacitances to an OFF state. Therefore, the path between the adjacent capacitances 278 is in an opened state.

Furthermore, the timing control circuit 240 sets SWam such as the control signals SWa1 to SWa3 to a high level (H), and controls the switches 286 of all columns to an ON state. Therefore, power is supplied to the amplifier 275 in all columns.

Furthermore, the timing control circuit 240 sets SWbm such as the control signals SWb1 to SWb3 to a high level (H), and controls the switches 287 of all columns to an ON state. Therefore, in all columns, the capacitances 278 corresponding to the signal lines are connected to the vertical signal line 269-m.

The sample-hold circuits 270 of all columns sample the input signal from the timing T4 to timing T41. Then, the sample-hold circuits 270 of all columns perform an operation for removing noise from the timing T41 to timing T43. The sample-hold circuits 270 of all columns hold the input signal from the timing T43 to the timing 15, and output the signal as an output signal. This output signal (pixel signal) is AD-converted by the AD converter 291. In other words, the pixel signal is read.

With the above control, pixel signals of all columns are transmitted via the vertical signal line 269-m with respect to each row. That is, the pixel signals of all the pixels are read without being decimated.

Figure 8:
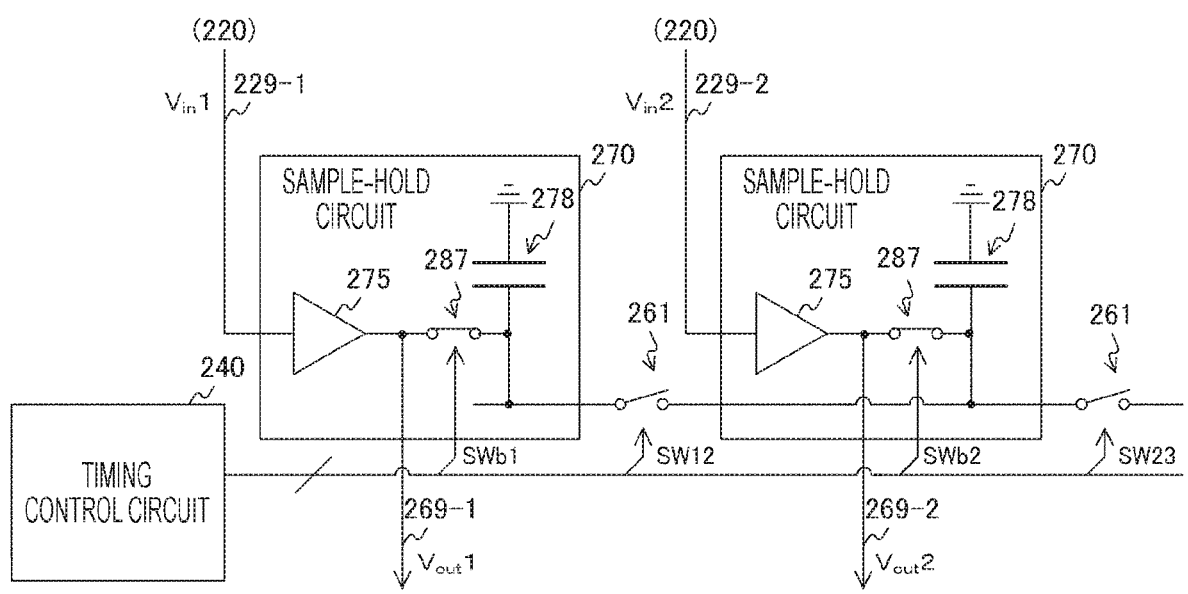
FIG. 8 is a diagram illustrating an example of a state of a switch in the solid-state imaging element when a normal mode is set according to the first embodiment of the present technology.

FIG. 8 is a diagram illustrating an example of a state of a switch in the solid-state imaging element 200 when the normal mode is set according to the first embodiment of the present technology. The timing control circuit 240 sets all the switches 261 between the adjacent capacitances 278 to an OFF state, and brings the path between the capacitances 278 into an open state. Furthermore, the timing control circuit 240 brings the switches 287 of all columns into an ON state and connects the corresponding capacitances 278 to the vertical signal line 269-$m$. Therefore, the pixel signals of all columns are read out simultaneously.

Figure 9:
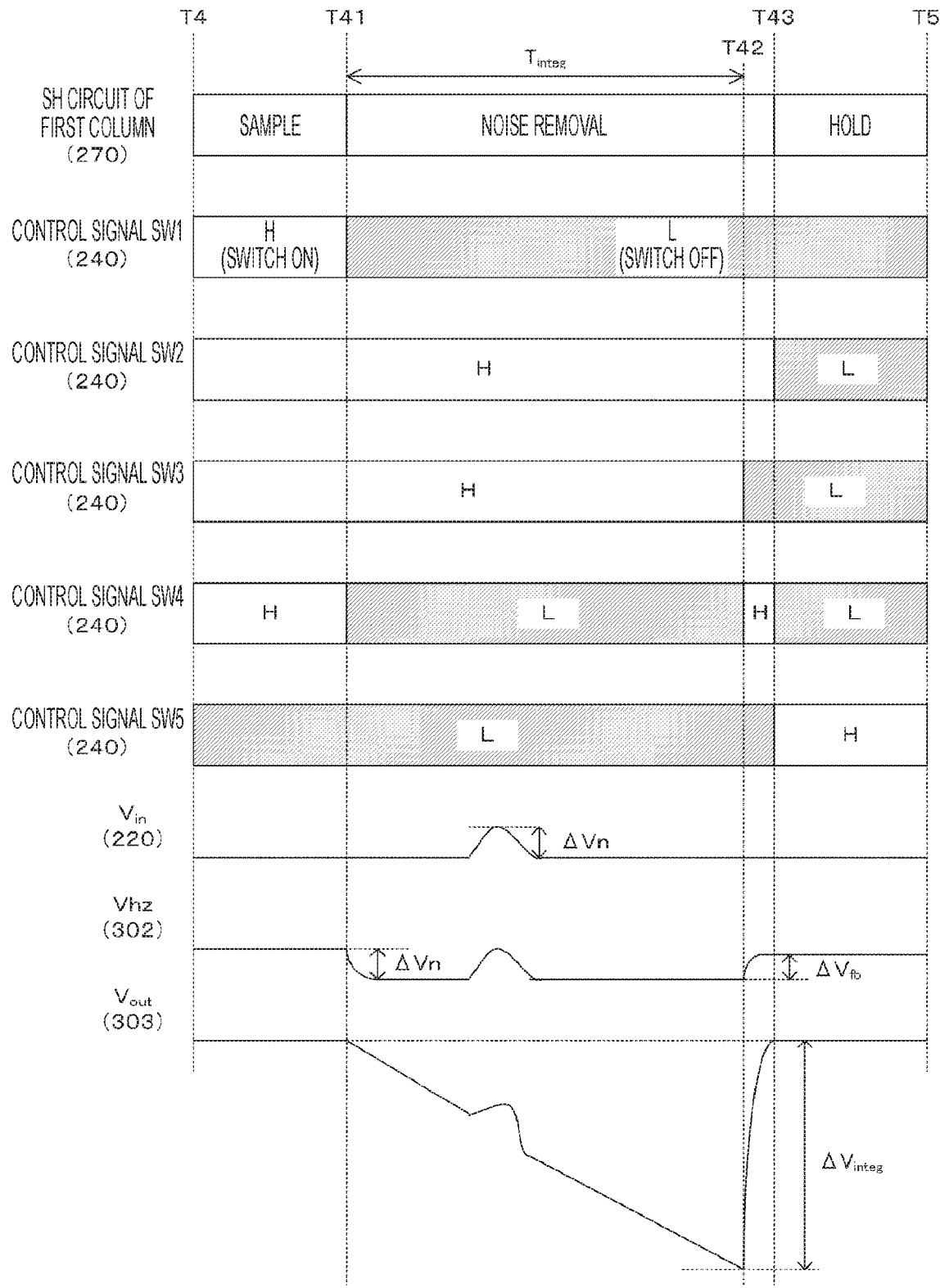
FIG. 9 is a timing chart illustrating an example of an operation of the sample-hold circuit according to the first embodiment of the present technology.

FIG. 9 is a timing chart illustrating an example of an operation of the sample-hold circuit 270 according to the first embodiment of the present technology. First, the timing control circuit 240 sets the control signals SW1 to SW4 to a high level and sets the control signal SW5 to a low level from the timings T4 to T41. Therefore, while the input signal $V_{in}m$ is in an input state, the node 302 at the potential Vhz and the node 303 at the potential of the output signal $V_{out}m$ are short-circuited, and the amplifier 275 is brought into an auto-zero state. Then, a potential difference between the input signal $V_{in}m$ and the potential Vhz is sampled by the capacitance 274. Furthermore, the nodes 300 and 301 at potentials Va and Vb are initialized by the potential of the output signal $V_{out}m$.

Next, at the timing T41, the timing control circuit 240 sets the control signals SW1 and SW4 to a low level, and sets the amplifier 275 to an open loop state. When the switch 281 is brought into an OFF state by the control signal SW1, the potential of the node 302 of the potential Vhz varies due to kTC noise or charge injection feedthrough. Assuming that this variation amount is $\Delta Vn$, a potential variation amount $K_0$ per unit time of the node 303 on the output side of the amplifier 275 in the open loop state is expressed by the following formula.

$$K_0 = (\Delta Vn \times gm)/C_{integ} \qquad \text{Formula 1}$$

In the above formula, gm is the transconductance of the N-type transistor 277 in the amplifier 275, and the unit is, for example, Siemens (S). Furthermore, $C_{integ}$ is the capacitance value of the capacitance 278, and the unit is, for example, Farad (F). The unit of the potential variation amount $K_0$ is, for example, volt (V).

The potential variation amount $\Delta V_{integ}$ of the node 303 on the output side when a certain noise accumulation time $T_{integ}$ has elapsed from the timing T41 at which the auto-zero state is released is represented by the following formula.

$$\Delta V_{integ} = K_0 \times T_{integ} \qquad \text{Formula 2}$$

Then, at the timing T42 at which the noise accumulation time $T_{integ}$ has elapsed, the timing control circuit 240 sets the control signal SW3 to a low level. Therefore, the capacitance 271 is disconnected from the node 303 on the output side. Furthermore, the timing control circuit 240 sets the control signal SW4 to a high level from the timing T42 to the timing T43 at which a predetermined pulse period elapses. Therefore, the potential variation amount $\Delta V_{integ}$ is fed back to the node 302 of the potential Vhz via the capacitances 272 and 273. The voltage transfer gain of this feedback path is determined by the voltage division ratio of the capacitances 271 to 274, and assuming that the value is $K_{fb}$, the feedback voltage $\Delta V_{fb}$ is expressed by the following formula.

$$\Delta V_{fb} = K_{fb} \times \Delta V_{integ} \qquad \text{Formula 3}$$

If the transconductance gm, the capacitance value $C_{integ}$, and the voltage transfer gain $K_{fb}$ are adjusted on the basis of Formulae 1 to 3 so that $\Delta V_{fb}$ becomes substantially equal to a noise component $\Delta Vn$ generated after the auto-zero release, the noise component can be removed from the output signal.

Furthermore, a noise component input to the sample-hold circuit 270 during the noise accumulation time is averaged. Thus, not only a kTC noise offset component caused by the control of the switch in the sample-hold circuit 270, but also a circuit noise generated in the pixel 230 and the load MOS circuit 251 in the preceding stage can be reduced.

A noise transfer function NTF (f) during the noise accumulation time is expressed by the following formula.

$$NTF(f) = \text{sinc}(\omega \times T_{integ}) \qquad \text{Formula 4}$$
$$= \sin(\omega \times T_{integ})/(\omega \times T_{integ})$$

In the above formula, a is a cutoff frequency, and the unit is, for example, hertz (Hz). sin( ) is a sine function.

According to Formula 4, as the noise accumulation time $T_{integ}$ becomes longer, the noise band can be limited and the noise component can be effectively reduced. For example, in the case of thermal noise, when the noise accumulation time $T_{integ}$ is doubled, the noise component can be reduced to $1/(2^{1/2})$ times. Furthermore, when the noise accumulation time $T_{integ}$ is quadrupled, the noise component can be reduced by half.

However, as exemplified in Formula 3, the transition amplitude of the node 303 on the output side during the noise accumulation time increases in proportion to the noise accumulation time $T_{integ}$. Specifically, when the potential of the node 303 is excessively increased, the P-type transistor 276 shifts from a saturation region operation to a linear region operation. In this case, Formulae 1 and 2 based on the saturation region operation of the P-type transistor 276 cannot be held, and the noise component cannot be removed sufficiently.

In order not to suppress the circuit range, when the noise accumulation time $T_{integ}$ is made long enough to sufficiently remove noise, it is desirable that the capacitance value of the capacitance 278 increase accordingly. For example, in a case where the noise accumulation time $T_{integ}$ is doubled, it is desirable to double the capacitance value of the capacitance 278 as well. However, when the capacitance value of the capacitance 278 with respect to each column is increased, the circuit area of the solid-state imaging element 200 is increased. Thus, the switch 261 between the capacitances connects a plurality of adjacent capacitances 278 to the vertical signal line 269-$m$ in parallel.

Figure 10:
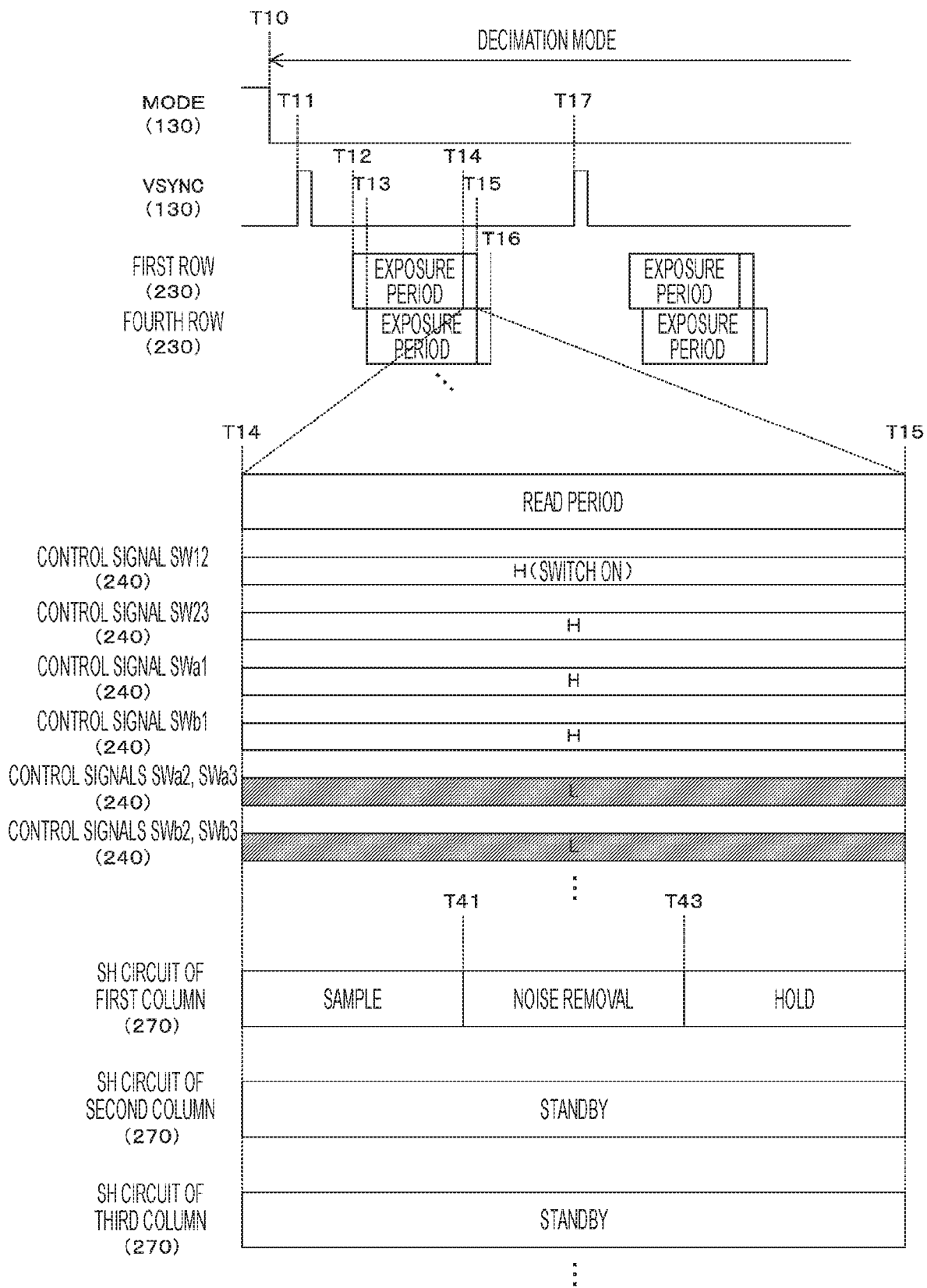
FIG. 10 is a timing chart illustrating an example of an operation of the solid-state imaging element when a decimation mode is set according to the first embodiment of the present technology.

FIG. 10 is a timing chart illustrating an example of an operation of the solid-state imaging element 200 when the decimation mode is set according to the first embodiment of the present technology. For example, it is assumed that the imaging control unit 130 sets the decimation mode according to the mode signal MODE at the timing T10. The vertical synchronization signal VSYNC is controlled to a high level over a predetermined pulse period from the timing T11 after the timing T10. Furthermore, the vertical synchronization signal VSYNC is controlled to a high level over a pulse period from the timing T17.

The vertical scanning circuit 210 starts the exposure of the first row at the timing T12 within the cycle of the vertical synchronization signal VSYNC, and ends the exposure of the first row at the timing T14 at which the exposure period has elapsed.

Furthermore, the vertical scanning circuit 210 starts the exposure of the fourth row at the timing T13 after the timing T12, and ends the exposure of the fourth row at the timing T15 at which the exposure period has elapsed. Similarly, for the fifth and subsequent rows, the 3k−1-th rows are sequentially exposed 3k-th rows and 3k+2-th rows are decimated.

On the other hand, the timing control circuit 240 sets the control signals SW(3k+1) (3k+2) such as the control signal SW12 to a high level (H) over a period from the timing T14 to the timing T15 at which a certain read period elapses.

Furthermore, in that, period, the timing control circuit 240 sets the control signals SW(3k+2) (3k) such as the control signal SW23 to a high level (H). On the other hand, the control signal SW(3k) (3K+1) is controlled to a low level. Therefore, the switch 261 between the 3k+1 and 3k+2 columns and the switch 261 between the 3k+2 and 3k columns are brought into an ON state, and the remaining switches 261 are brought into an OFF state. In other words, the path between the adjacent three columns of capacitances is in a closed state.

Furthermore, the timing control circuit 240 sets the control signals SWa (3k+1) and SWb (3k+1) such as the control signals SWa1 and SWb1 to a high (H) level, and sets the remaining control signals Sham to a low level. Therefore, power is supplied to the amplifier 275 of the 3k+1 column, and the three capacitances 278 are connected in parallel to the vertical signal line 269-(3k+1).

The sample-hold circuit 270 of the 3k+1-th column performs sampling, noise removal, and holding of the sampled signal in the read period. Therefore, the pixel signal of the 3k+1-th column is transmitted and read via the vertical signal line 269-(3k+1). On the other hand, the sample-hold circuits 270 of the 3k+2-th and 3k-th columns shift to a standby state. Here, the standby state means that at least the switch 282 is in an OFF state. The state of the remaining switches may be either the ON state or the OFF state. Therefore, the pixel signals of the 3k-th column and the 3k+2-th column are decimated.

Note that although the solid-state imaging element 200 decimates both rows and columns in the decimation mode, but may not decimate the rows, but may decimate the columns only. Furthermore, the solid-state imaging element 200 decimates two columns among the 3k, 3k+1, and 3k+2 columns, but the columns to be decimated are not limited to these columns. For example, a configuration may be employed in which one of the even columns and the odd columns is decimated.

Figure 11:
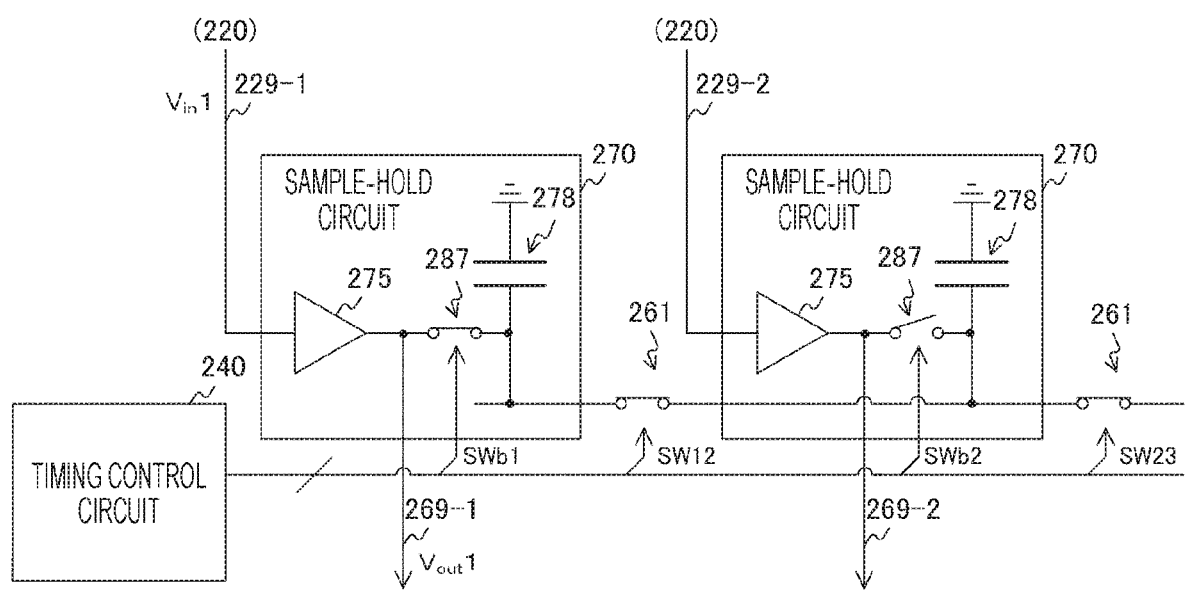
FIG. 11 is a diagram illustrating an example of a state of a switch in the solid-state imaging element when a decimation mode is set according to the first embodiment of the present technology.

FIG. 11 is a diagram illustrating an example of a state of a switch in the solid-state imaging element 200 when the normal mode is set according to the first embodiment of the present technology. The timing control circuit 240 sets the switches 261 of the 3k+1 and 3k+2 columns and the switches 261 between the 3k+2 and 3k columns to an ON state, and sets the remaining switches 261 to an OFF state. Furthermore, the timing control circuit 240 sets the switch 287 of the 3k+1 column to an ON state, and sets the switches 287 of the remaining columns to an OFF state. Therefore, one end of each of the three capacitances 278 is connected to the vertical signal line 269-(3k+1). In other words, the capacitances 278 of the 3k column and 3k+2 column are provided in the 3k+1 column.

Here, for the sake of convenience, the sample-hold circuit 270 of the column to be read is referred to as a "recipient", and the sample-hold circuit 270 that provides a capacitance to the recipient is referred to as a "donor". For example, a circuit of the 3k+1 column corresponds to the recipient, and the remaining circuits correspond to the donor. As the donor supplies a capacitance to the recipient as described above, the capacitance value connected to the vertical signal line 269-(3k+1) can be increased as compared with that in the normal mode. Therefore, the noise reduction effect can be increased and the SN ratio can be improved as compared with that in the normal mode. In recent years, with an increase in number of pixels, the size of a transistor in a pixel has become smaller, and noise due to the transistor, particularly 1/f noise, has become more dominant than noise during AD conversion. Such noise can be reduced by an increase in capacitance value.

This decimation mode is suitable in a case where the effect of noise reduction is prioritized even if there is some sacrifice in frame rate, such as when capturing a scene with low illuminance. Furthermore, unlike when capturing a still image in which the pixel signals of all pixels are individually AD-converted, decimation and averaging may be performed when capturing a moving image. Therefore, for example, in a case of capturing a moving image, the decimation mode can be used.

By adjusting the ratio of the number of donors to the number of recipients according to the length of the required noise accumulation time $T_{integ}$, the combined capacitance of the capacitances 278 connected in parallel can be set to a desired value.

Furthermore, by setting the donor switch 287 to an OFF state and disconnecting the output terminal of the donor amplifier 275 from the capacitance 278, interference of noise generated in the donor with the recipient can be suppressed.

Furthermore, by setting the donor switch 286 to an OFF state and cutting off the power supply to the donor amplifier 275, power consumption can be reduced. Note that in a case where priority is given to reducing the circuit scale over reducing power consumption, the switch 286 may be omitted in the configuration so that power supply to the donor is not cut off.

Note that the recipient capacitance 278 such as 3k+1 column is an example of the first capacitance described in the claims. The donor capacitance 278, such as 3k column or 3k+2 column, is an example of the second capacitance described in the claims. The recipient switch 287 is an example of the first capacitance connection circuit described in the claims, and the donor switch 287 is an example of the second capacitance connection circuit described in the claims. The circuit including the switch 261 is an example of the intercapacitance connection circuit described in the claims. The recipient sample-hold amplifier circuit 280 is the first sample-hold amplifier circuit described in the claims, and the donor sample-hold amplifier circuit 280 is the second sample-hold amplifier circuit described in the claims.

Figure 12:
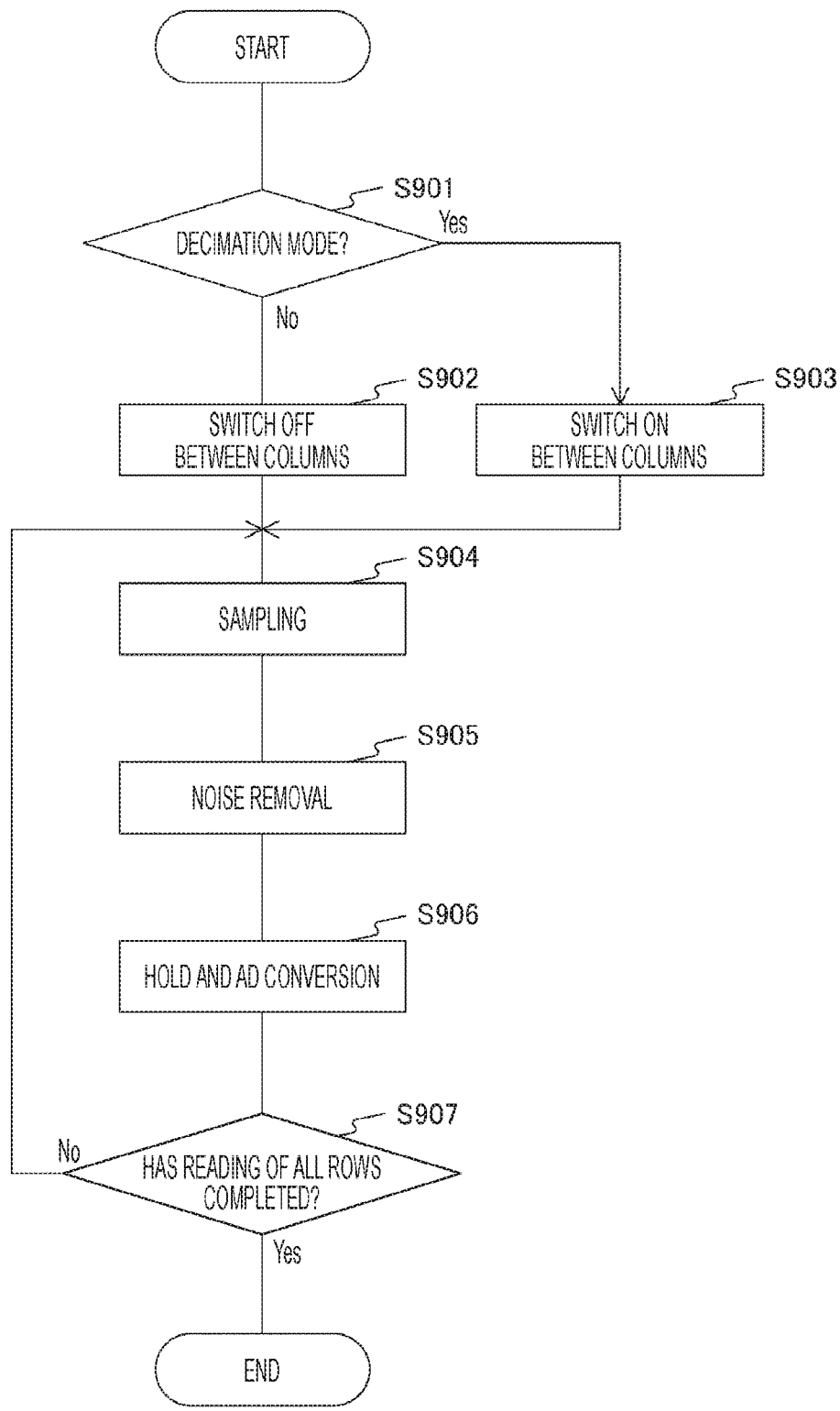
FIG. 12 is a flowchart illustrating an example of an operation of the solid-state imaging element when the decimation mode is set according to the first embodiment of the present technology.

FIG. 12 is a flowchart illustrating an example of an operation of the solid-state imaging element 200 when the decimation mode is set according to the first embodiment of the present technology. This operation is started, for example, when a predetermined application for capturing image data is executed.

The imaging control unit 130 in the solid-state imaging element 200 determines whether or not a current mode is the decimation mode (step S901). In a case where the mode is not the decimation mode (step S901: No), the timing control circuit 240 controls the switch 261 between columns to an OFF state (step S902). On the other hand, in a case where the mode is the decimation mode (step S901: Yes), the timing control circuit 240 sets the switch 261 between the 3k+1 column and the 3k+2 column and the switch 261 between the 3k+2 column and the 3k column to an ON state. The remaining switches 261 are controlled to an OFF state (step S903).

After step S902 or S903, the sample-hold circuit 270 of a column to be read samples a pixel signal (step S904) and removes a noise component (step S905). Then, the sample-hold circuit 270 holds the pixel signal, and the AD converter 291 performs AD conversion (step S906). Therefore, a row to be read is read. Then, the solid-state imaging element 200 determines whether or not reading of all rows has been completed (step S907).

In a case where reading of all rows has not been completed (step S907: No), the solid-state imaging element 200 repeats step S904 and subsequent steps. In a case where reading of all rows is completed (step S907: Yes), the solid-state imaging element 200 ends an imaging operation. In a case where a plurality of image data is continuously captured, steps S901 to S907 are repeatedly executed in synchronization with the vertical synchronization signal VSYNC.

As described above, according to the first embodiment of the present technology, in the decimation mode, the switch 261 connects one end of each of the plurality of adjacent, capacitances 278 to the signal line, and therefore the capacitance value of the combined capacitances connected to the signal line can be increased. Therefore, it is possible to reduce the nose component of the pixel signal and improve the SN ratio.

2. Second Embodiment

In the above-described first embodiment, in the decimation mode, the timing control circuit 240 connects the plurality of capacitances 278 to the signal line in parallel to reduce the noise component. However, while the noise component can be reduced, rows and columns are decimated, resulting in a reduction in resolution. The timing control circuit 240 according to the second embodiment differs from that of the first embodiment, in that the plurality of capacitances 278 is connected in parallel to the signal line without decimation.

Figure 13:
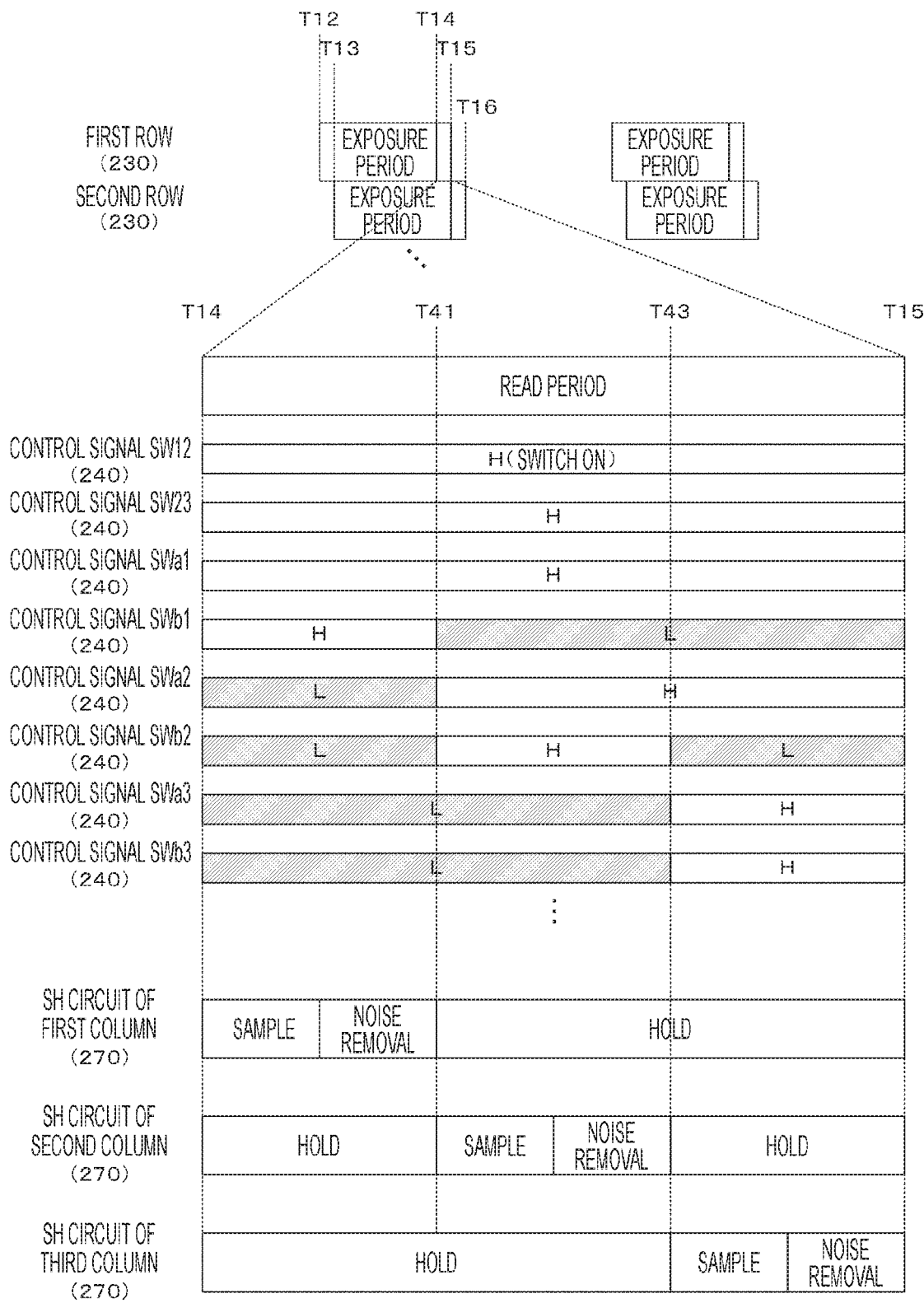
FIG. 13 is a timing chart illustrating an example of an operation of the solid-state imaging element when a high image quality mode is set according to a second embodiment of the present technology.

FIG. 13 is a timing chart illustrating an example of an operation of the solid-state imaging element when a high image quality mode is set according to the second embodiment of the present technology. In the second embodiment, one of the normal mode and the high image quality mode is set. Here, the high image quality mode is a mode in which a noise component is reduced by connecting the plurality of capacitances 278 in parallel without decimation.

In the high image quality mode, the timing control circuit 240 sets the control signals SW(3k+1) (3k+2) and the control signals SW (3k+2) (3k) to a high level as in the first embodiment, and sets the control signals SW(3k) (3k+1) to a low level. Note that the configuration is not limited to the setting of one of the normal mode and the high image quality mode, but may be the setting of one of the normal mode, the decimation mode, and the high image quality mode.

The timing control circuit 240 sets the control signal SWa(3k+1) to a high level from the timing T14 to the timing T15, and sets the control signal SWb(3k+1) to a high level during the period from the timing T14 to the timing T41.

Furthermore, the timing control circuit 240 sets the control signal SWa(3k+2) to a high level from the timing T41 to the timing T15, and sets the control signal SWb(3k+2) to a high level during the period from the timing T41 to the timing T43. Furthermore, the timing control circuit 240 sets the control signal SWa(3k) and the control signal SWb(3k) to a high level from the timing T43 to the timing T15.

In the period from the timing T14 to the timing T41, the sample-bold circuit 270 of the 3k+1 column becomes a recipient, and performs sampling of pixel signals and noise removal. The remaining sample-hold circuits 270 become donors.

From the timing T41 to the timing T43, the sample-hold circuit 270 of the 3k+2 column becomes a recipient, and performs sampling of pixel signals and noise removal. The remaining sample-hold circuits 270 become donors.

From the timing T43 to the timing T15, the sample-hold circuit 270 of the 3k column becomes a recipient, and performs sampling of pixel signals and noise removal. The remaining sample-hold circuits 270 become donors.

With the above-described control, every time a row is selected, pixel signals of three adjacent columns are sequentially output. Furthermore, the pixel signals of these three adjacent columns are sequentially AD-converted by one AD converter 291 shared by the three columns.

The AD converter 291 in the subsequent stage generally has a larger circuit scale than the sample-hold circuit 270 having a relatively simple circuit configuration. Therefore, it is considered that a circuit configuration in which the same AD converter 291 shares a plurality of sample-hold circuits 270 has efficient area and power. Thus, by the high image quality mode in which the AD converter 291 sharing the sample-hold circuit 270 in the hold state sequentially performs AD conversion, both the maintenance of the throughput of AD conversion and low noise can be achieved.

As described above, according to the second embodiment of the present technology, ever; time a row is selected, the capacitances of three adjacent columns are connected in parallel, and the pixel signals of those columns are sequentially output, so that noise can be reduced and the pixel signals of all columns can be read without decimation.

3. Third Embodiment

In the above-described first embodiment, the solid-state imaging element 200 samples the pixel signals only once. However, with only one sampling, there is a possibility that a noise component generated in the pixel cannot be removed from the pixel signal. The solid-state imaging element 200 according to the third embodiment is different from that of the first embodiment in that correlated double sampling (CDS) processing is performed on pixel signals.

Figure 14:
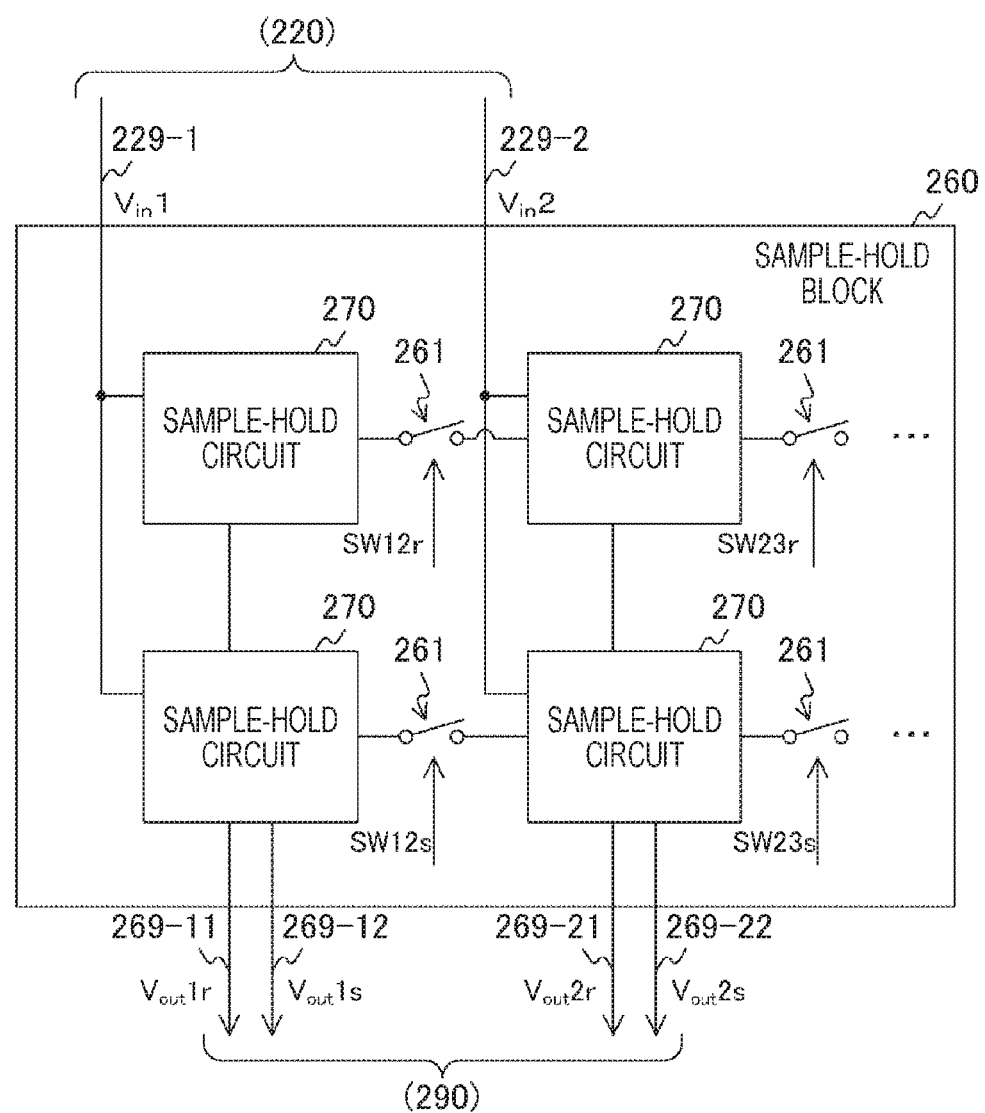
FIG. 14 is a block diagram illustrating a configuration example of a sample-hold block according to a third embodiment of the present technology.

FIG. 14 is a block diagram illustrating a configuration example of the sample-hold block 260 according to the third embodiment of the present technology. The sample-hold block 260 of the third embodiment differs from that of the first embodiment in that a pair of sample-hold circuits 270 is provided with respect to each column. For example, when the number of columns is M, 2×M sample-hold circuits 270 are arranged. The switch 261 is also doubled in accordance with the doubling of the number of sample-hold circuits 270. For example, 2×(M−1) switches 261 are arranged.

For each column, one of the pair of sample-hold circuits 270 of that column samples a reset level and the other samples a signal level. Here, the reset level means the level of the pixel signal at the time when the pixel 230 is initialized by the reset signal RST, Furthermore, the signal level means the level of a pixel signal when charges are transferred in the pixel 230 by the transfer signal TRG.

The sample-hold circuit 270 holding the reset level outputs an output signal $V_{out}mr$ via a vertical signal line 269-$m$1, and the sample-hold circuit 270 holding the signal level outputs an output signal $V_{out}ms$ via a vertical signal line 269-$m$2.

Figure 15:
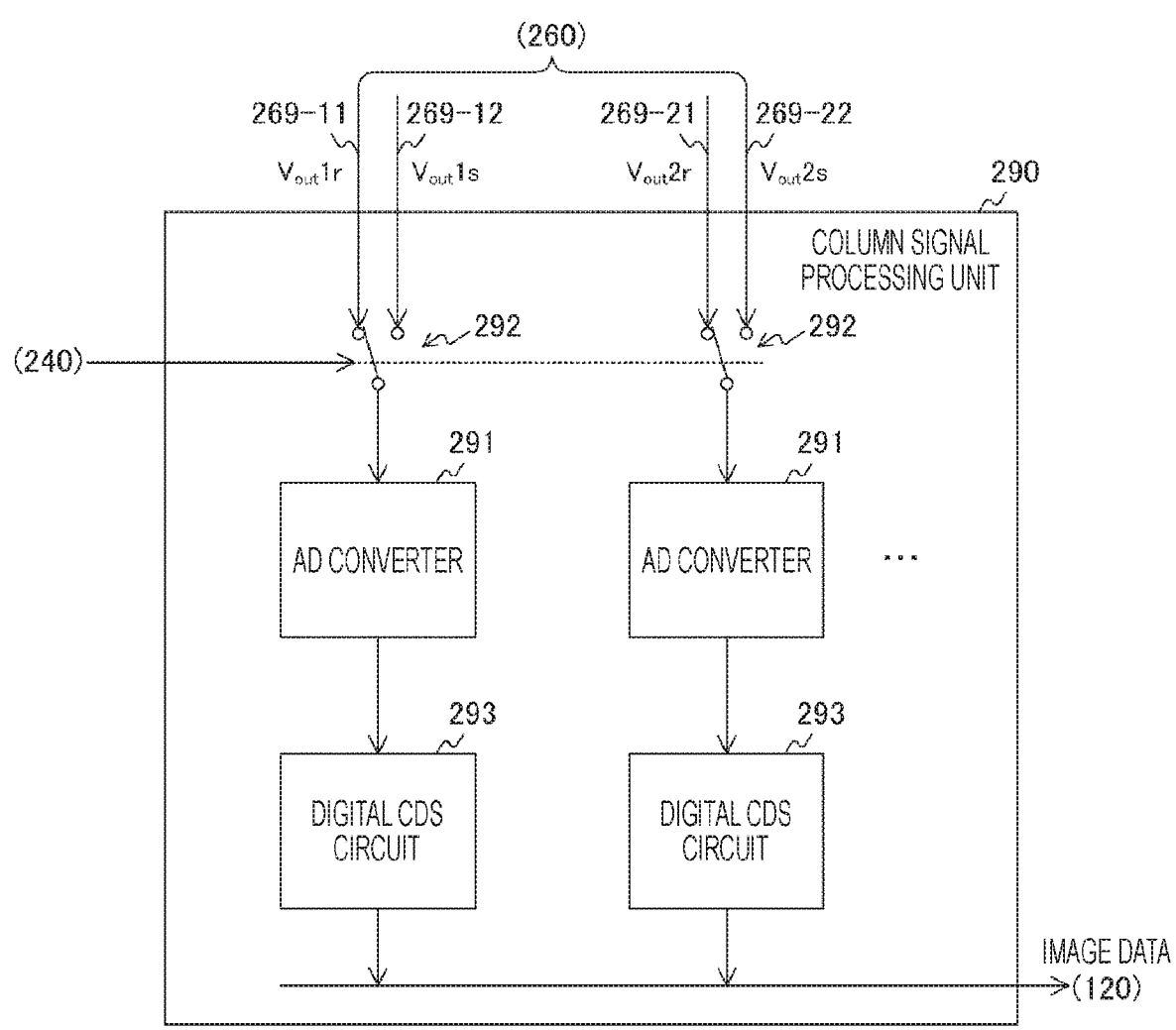
FIG. 15 is a block diagram illustrating a configuration example of a column signal processing unit according to the third embodiment of the present technology.

FIG. 15 is a block diagram illustrating a configuration example of the column signal processing unit 290 according to the third embodiment of the present technology. The column signal processing unit 290 of the third embodiment differs from that of the first embodiment in that a switch 292 and a digital CDS circuit 293 are further arranged with respect to each column.

The switch 292 connects one of the vertical signal lines 269-*m*1 and 269-*m*2 to the input terminal of the AD converter 291 under the control of the timing control circuit 240. The switch 292 connects the vertical signal line 269-*m*1 to the AD converter 291 when the output signal $V^{out}$mr is output, and connects the vertical signal line 269-*m*2 when the output signal $V_{out}$ms is output.

The AD converter 291 sequentially performs AD conversion on the output signal $V_{out}$mr (reset level) and the output signal $V_{out}$ms (signal level) and supplies the signals to the digital CDS circuit 293.

The digital CDS circuit 293 determines a difference between the digital signal indicating the reset level and the digital signal indicating the signal level, and outputs the difference as a net pixel signal. The processing of sequentially sampling the reset level and the signal level and determining the difference therebetween is called CDS processing. Within the CDS processing, the processing of determining the difference between the digital signals is called digital CDS processing. By this digital CDS processing, a noise component or the like generated when the pixel 230 is reset can be reduced, and the SN ratio can be further improved.

Figure 16:
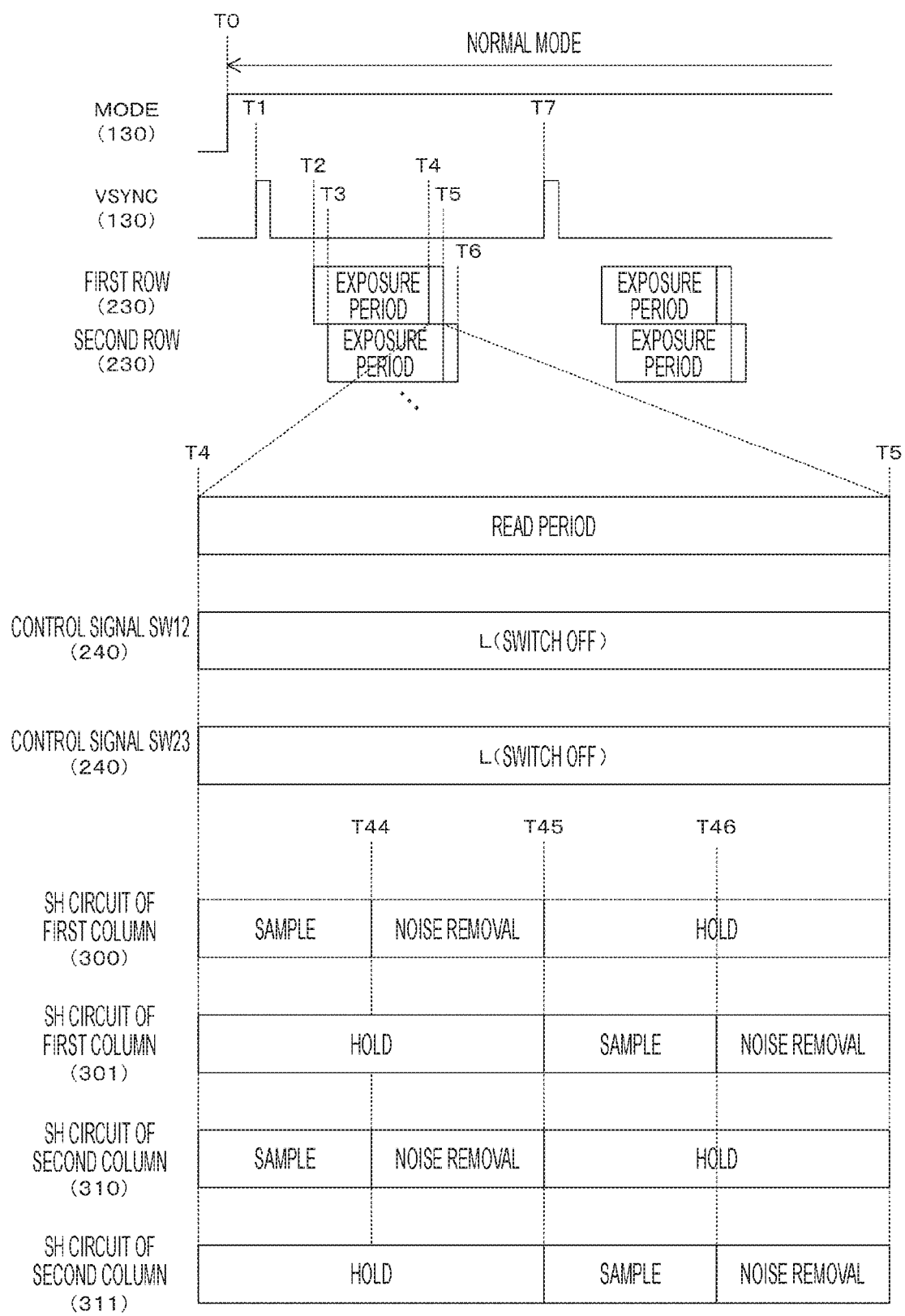
FIG. 16 is a timing chart illustrating an example of an operation of the solid-state imaging element when a normal mode is set according to the third embodiment of the present technology.

FIG. 16 is a timing chart illustrating an example of an operation of the solid-state imaging element 200 when the normal mode is set according to the third embodiment of the present technology. The method for controlling the switches 286, 287, and 261 of the third embodiment is similar to that of the first embodiment.

In each of the columns, the sample-hold circuit 270 corresponding to the reset level samples the reset level of an n (n is an integer)-th row from the timing T4 to the timing T44, and removes noise until the timing T45. Furthermore, from the timing T4 to the timing T45, the sample-hold circuit 270 corresponding to the signal level holds the signal level of an n−1-th row.

Furthermore, the sample-hold circuit 270 corresponding to the reset level holds the reset level of the n-th row from the timing T45 to the timing T5. Furthermore, the sample-hold circuit 270 corresponding to the signal level samples the signal level of the n-th row from the timing T45 to the timing T46, and removes noise until the timing T5.

As described above, when one of the pair of sample-hold circuits 270 samples the reset level of the n-th row, the other holds the signal level of the n−1-th row. At this time, the signal level of the n−1-th row is AD-converted. Furthermore, when one of the pair of sample-hold circuits 270 holds the reset level of the n-th row, the other samples the signal level of the n-th row. At this time, the reset level of the n-th row is AD-converted. By such a pipeline operation, the utilization efficiency of the AD converter 291 can be improved.

Note that in a case where the decimation mode is set, the switch 261 connects one end of each of the plurality of adjacent capacitances 278 to the signal line as in the first embodiment. Then, the pair of sample-hold circuits 270 corresponding to a column to be read performs a pipeline operation, and the remaining sample-hold circuits 270 are set to a standby state.

As described above, according to the third embodiment of the present technology, the pair of sample-hold circuits 270 sequentially samples the reset level and the signal level with respect to each column, and the SN ratio can be further improved by the digital CDS processing that determines the difference therebetween.

[First Variation]

In the above-described third embodiment, the digital CDS circuit 293 is added with respect to each column to perform the digital CDS processing. However, the digital CDS circuit 293 increases the circuit scale of the digital circuit. The solid-state imaging element 200 according to the first variation of the third embodiment is different from that of the third embodiment in that analog CDS processing for determining a difference between an analog reset level and a signal level is performed.

Figure 17:
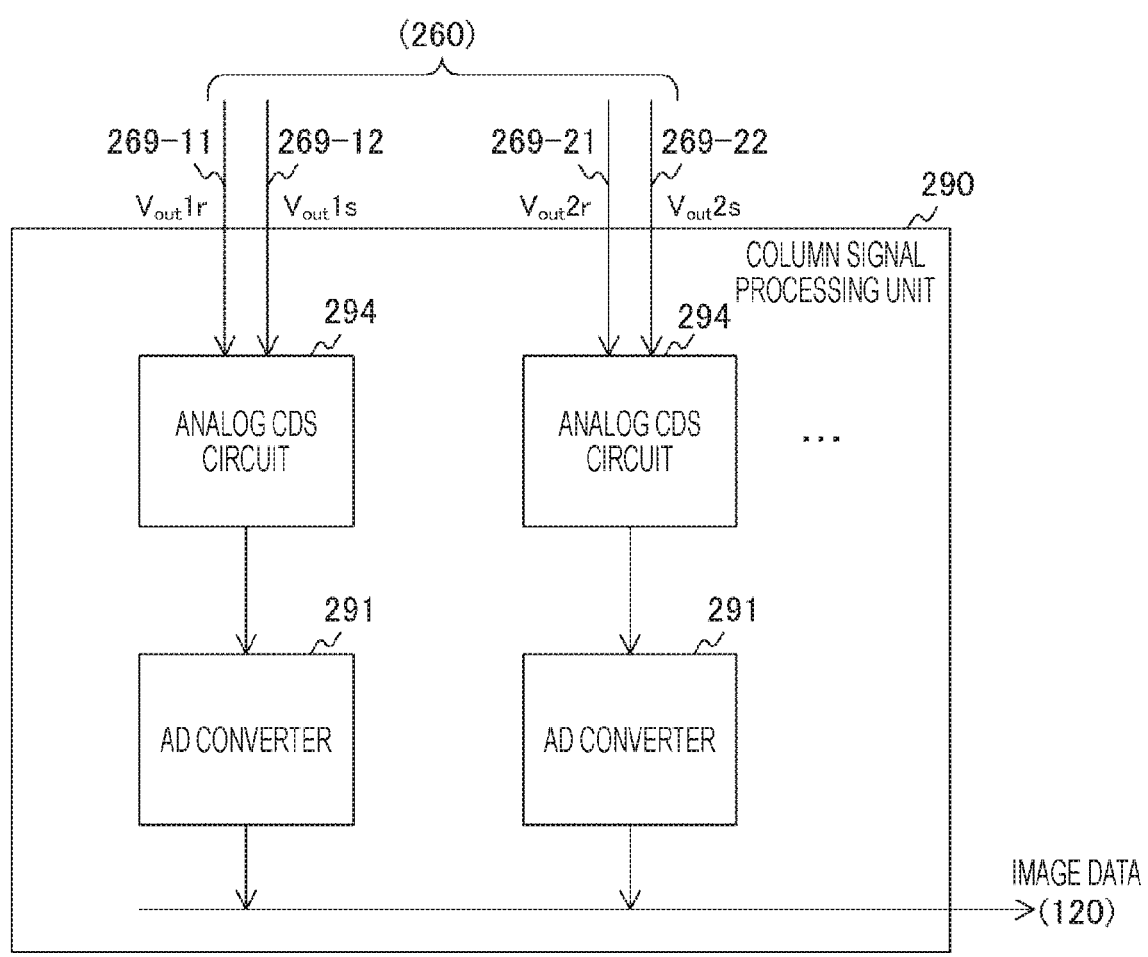
FIG. 17 is a block diagram illustrating a configuration example of a column signal processing unit according to a first variation of the third embodiment of the present technology.

FIG. 17 is a block diagram illustrating a configuration example of the column signal processing unit 290 according to the first variation of the third embodiment of the present technology. The column signal processing unit 290 of the first variation of the third embodiment is different from that of the third embodiment in that an analog CDS circuit 294 is arranged instead of the switch 292 and the digital CDS circuit 293 with respect to each column.

The analog CDS circuit 294 performs analog CDS processing for determining a difference between the analog reset level and the signal level. The analog CDS circuit 294 supplies a signal after the analog CDS processing to the AD converter 291 as a net pixel signal.

Figure 18:
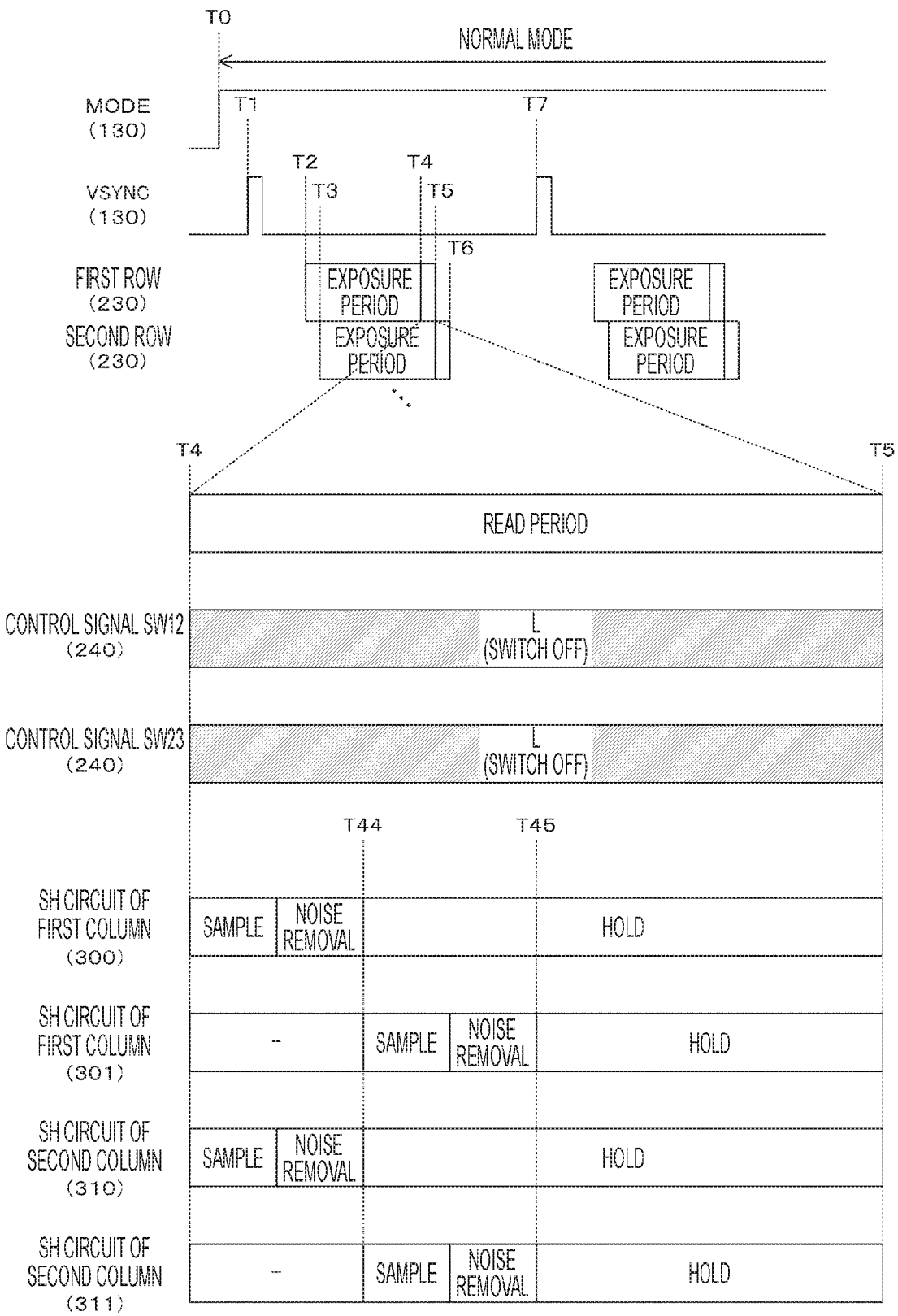
FIG. 18 is a timing chart illustrating an example of an operation of the solid-state imaging element when a normal mode is set according to the first variation of the third embodiment of the present technology.

FIG. 18 is a timing chart illustrating an example of an operation of the solid-state imaging element 200 when the normal mode is set according to the first variation of the third embodiment of the present technology. From the timing T4 to the timing T44, the sample-hold circuit 270 corresponding to the reset level samples the reset level and removes noise. On the other hand, the state of the sample-hold circuit 270 corresponding to the signal level at this time is not limited.

Then, from the timing T44 to the timing T5, the sample-hold circuit 270 corresponding to the reset level holds the reset level. On the other hand, from the timing T44 to the timing T45, the sample-hold circuit 270 corresponding to the signal level samples the signal level and removes noise. Subsequently, from the timing 145 to the timing T5, the sample-hold circuit 270 corresponding to the signal level holds the signal level. From the timing T45 to the timing T5, the column signal processing unit 290 performs the analog CDS processing and AD-converts the processed pixel signal.

Note that in a case where the decimation mode is set, the switch 261 connects one end of each of the plurality of adjacent capacitances 278 to the signal line as in the first embodiment. Then, the pair of sample-hold circuits 270 corresponding to a column to be read sequentially performs sampling, and the remaining sample-hold circuits 270 are set to a standby state.

As described above, according to the first variation of the third embodiment of the present technology, since the analog CDS circuit 294 is arranged instead of the digital CDS circuit 293, the circuit scale of the digital circuit can be reduced.

[Second Variation]

In the first variation of the third embodiment described above, the pair of sample-hold circuits 270 is arranged with respect to each column, and the CDS processing is performed by performing sampling twice with respect to each row. However, the read speed is reduced as compared with the case where sampling is performed only once. The solid-state imaging element 200 according to the second variation of the third embodiment differs from that of the first variation of the third embodiment in that four sample-hold circuits 270 are arranged with respect to each column and they perform a pipeline operation.

Figure 19:
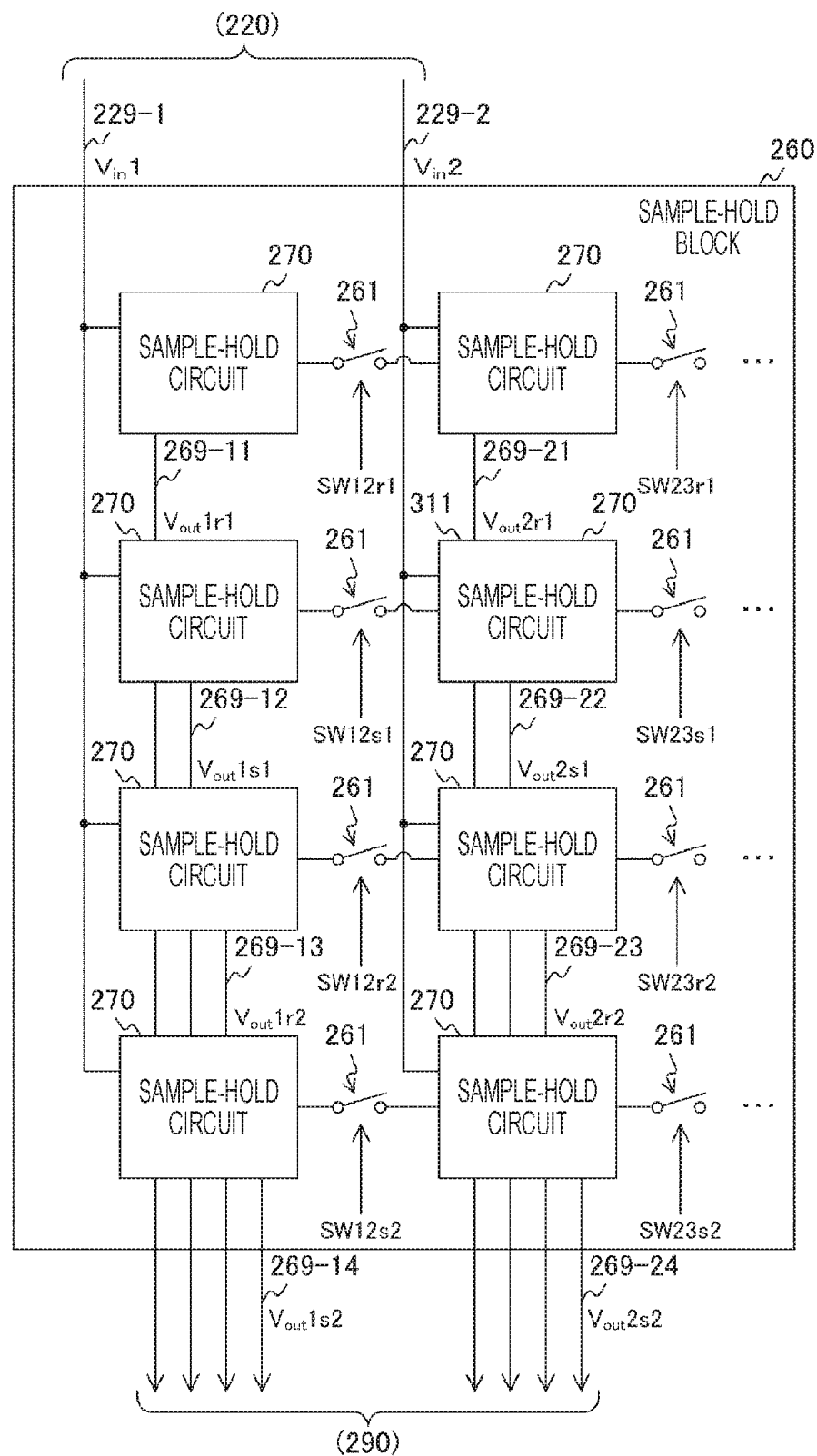
FIG. 19 is a block diagram illustrating a configuration example of a sample-hold block according to a second variation of the third embodiment of the present technology.

FIG. 19 is a block diagram illustrating a configuration example of the sample-hold block 260 according to the second variation of the third embodiment of the present technology. The sample-hold block 260 of the second variation of the third embodiment is different from that of the first variation of the third embodiment in that four sample-hold circuits 270 are provided with respect to each column. For example, when the number of columns is M, 4×M sample-hold circuits 270 are arranged. The switch 261 is also doubled in accordance with the doubling of the number of sample-hold circuits 270. For example, 4×(M−1) switches 261 are arranged.

Two of the four sample-hold circuits 270 sample the reset level and the remaining sample-hold circuits 270 sample the signal level. The two sample-hold circuits 270 corresponding to the reset level output output signals $V_{out}mr1$ and $V_{out}mr2$ via the vertical signal lines 269-$m$1 and 269-$m$3. Furthermore, the two sample-hold circuits 270 corresponding to the signal levels output output signals $V_{out}ms1$ and $V_{out}ms2$ via the vertical signal lines 269-$m$2 and 269-$m$4.

Figure 20:
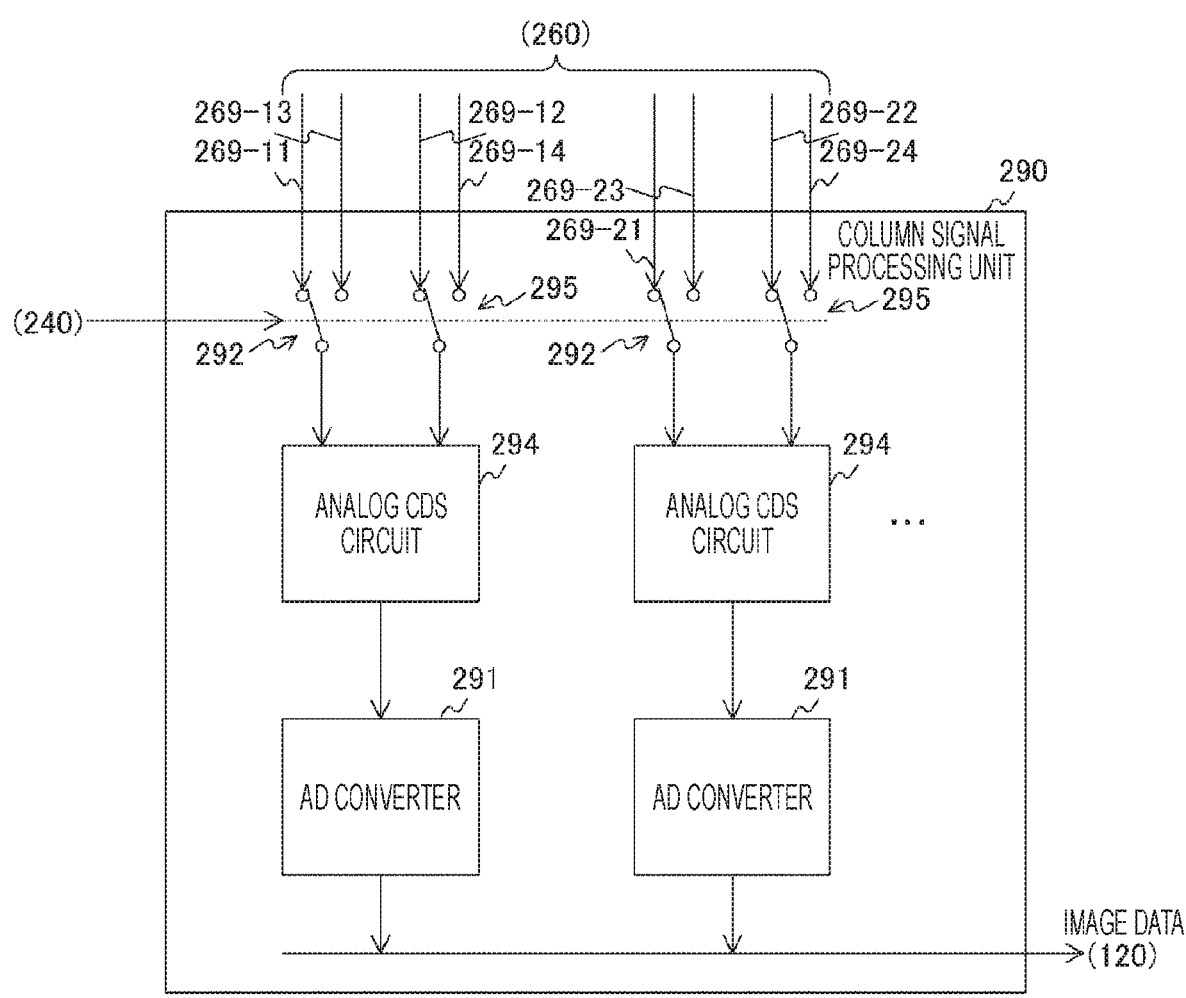
FIG. 20 is a block diagram illustrating a configuration example of a column signal processing unit according to a second variation of the third embodiment of the present technology.

FIG. 20 is a block diagram illustrating a configuration example of the column signal processing unit 290 according to the second variation of the third embodiment of the present technology. The column signal processing unit 290 of the second variation of the third embodiment differs from that of the variation of the third embodiment in that switches 292 and 295 are further arranged with respect to each column.

The switch 292 connects one of the vertical signal lines 269-$m$1 and 269-$m$3 to the input terminal of the analog CDS circuit 294 under the control of the timing control circuit 240. The switch 295 connects one of the vertical signal lines 269-$m$2 and 269-$m$4 to the input terminal of the analog COS circuit 294 under the control of the timing control circuit 240. These switches 292 and 295 connect the vertical signal lines 269-$m$1 and 269-$m$2 in a case where the output signals $V_{out}mr1$ and $V_{out}ms1$ are output. On the other hand, in a case where the output signals $V_{out}mr2$ and $V_{out}ms2$ are output, the switches 292 and 295 connect the vertical signal lines 269-$m$3 and 269-$m$4.

Figure 21:
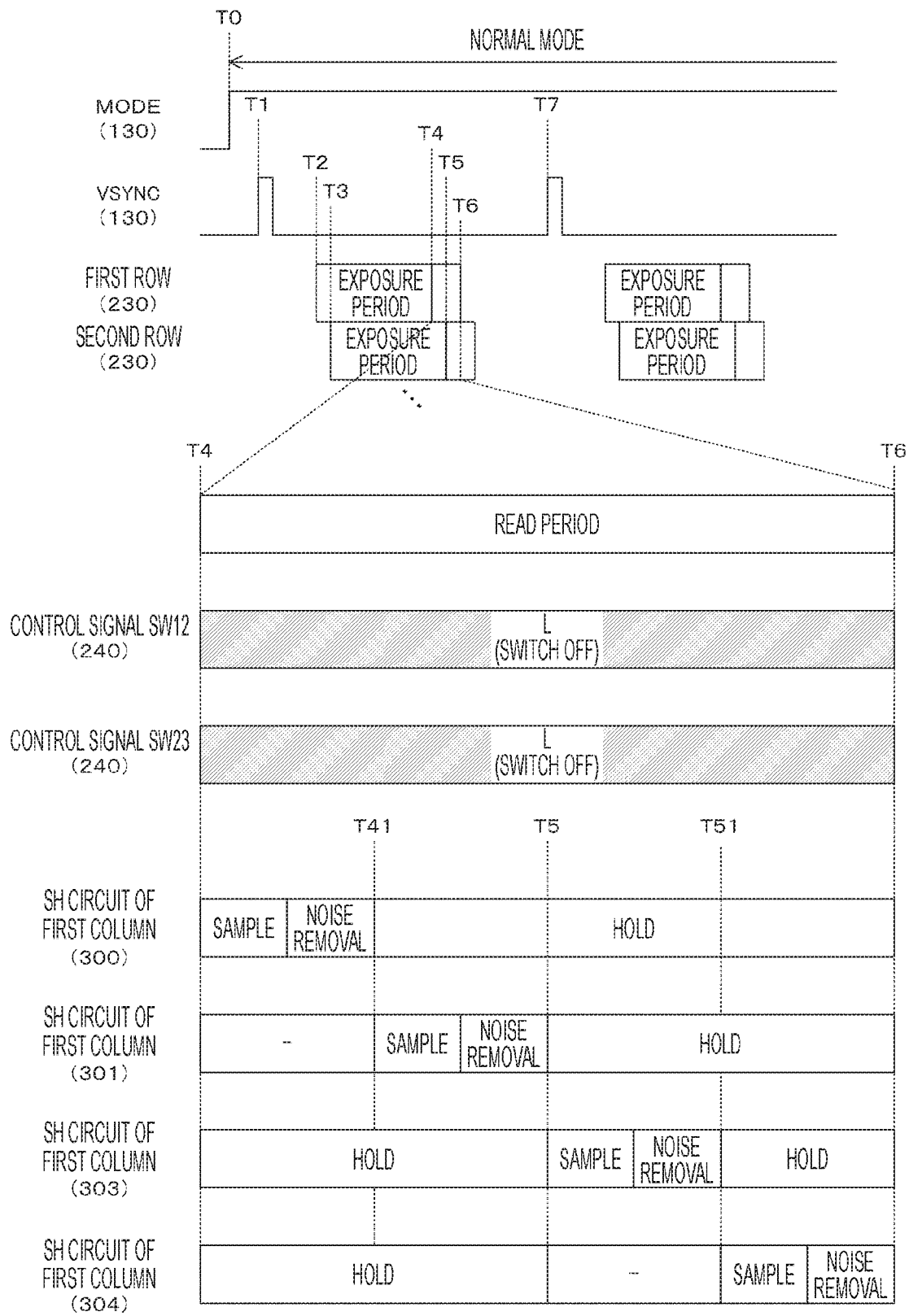
FIG. 21 is a timing chart illustrating an example of an operation of the solid-state imaging element when a normal mode is set according to the second variation of the third embodiment of the present technology.

FIG. 21 is a timing chart illustrating an example of an operation of the solid-state imaging element 200 when the normal mode is set according to the second variation of the third embodiment of the present technology. From the timing T4 to the timing T41, the first sample-hold circuit 270 samples the reset level of the n-th row and removes noise. On the other hand, the state of the second sample-hold circuit 270 at this time is not limited.

From the timing T41 to the timing T6, the first sample-hold circuit 270 among the four corresponding to the columns holds the reset level of the n-th row. From the timing T41 to the timing T5, the second sample-hold circuit 270 corresponding to the column samples the signal level of the n-th row and removes noise. Furthermore, from the timing T4 to the timing T5, the remaining two sample-hold circuits 270 corresponding to the columns hold the reset level and the signal level of the n−1-th row.

From the timing T5 to the timing T6, the second sample-hold circuit 270 corresponding to the column holds the signal level of the n-th row. From the timing T5 to the timing T51, the third sample-hold circuit 270 corresponding to the column samples the reset level of the n-th row and removes noise. On the other hand, the state of the fourth sample-hold circuit 270 corresponding to the column at this time is not limited.

From the timing T51 to the timing T6, the fourth sample-hold circuit 270 corresponding to the column samples the signal level of the n-th row and removes noise.

As described above, when two of the four sample-hold circuits 270 corresponding to the columns sample the reset level and the signal level of the n-th row, the remaining two hold the levels of the n−1-th row. At this time, the analog CDS processing is executed on the reset level and the signal level of the n−1-th row, and AD conversion is performed. Furthermore, when two of the four sample-hold circuits 270 hold the reset level and the signal level of the n-th row, the remaining two sample the levels of the n-th row. At this time, the analog CDS processing is executed on the reset level and the signal level of the n-th row, and AD conversion is performed. With such a pipeline operation, the read speed can be increased.

Note that in a case where the decimation mode is set, the switch 261 connects one end of each of the plurality of adjacent capacitances 278 to the signal line as in the first embodiment. Then, the four sample-hold circuits 270 corresponding to the column to be read sequentially perform sampling, and the remaining sample-hold circuits 270 are set to a standby state.

As described above, according to the second variation of the third embodiment of the present technology, the four sample-hold circuits 270 with respect to each column perform sampling and holding alternately. Therefore, the read speed can be increased as compared with the first variation of the third embodiment.

4. Application Examples to Moble Objects

The technology according to the present disclosure (present technology) is applicable to a variety of products. For example, the technology according to the present disclosure may be implemented as apparatuses mounted on any type of movable bodies such as automobiles, electric vehicles, hybrid electric vehicles, motorcycles, bicycles, personal mobilities, airplanes, drones, ships, and robots.

Figure 22:
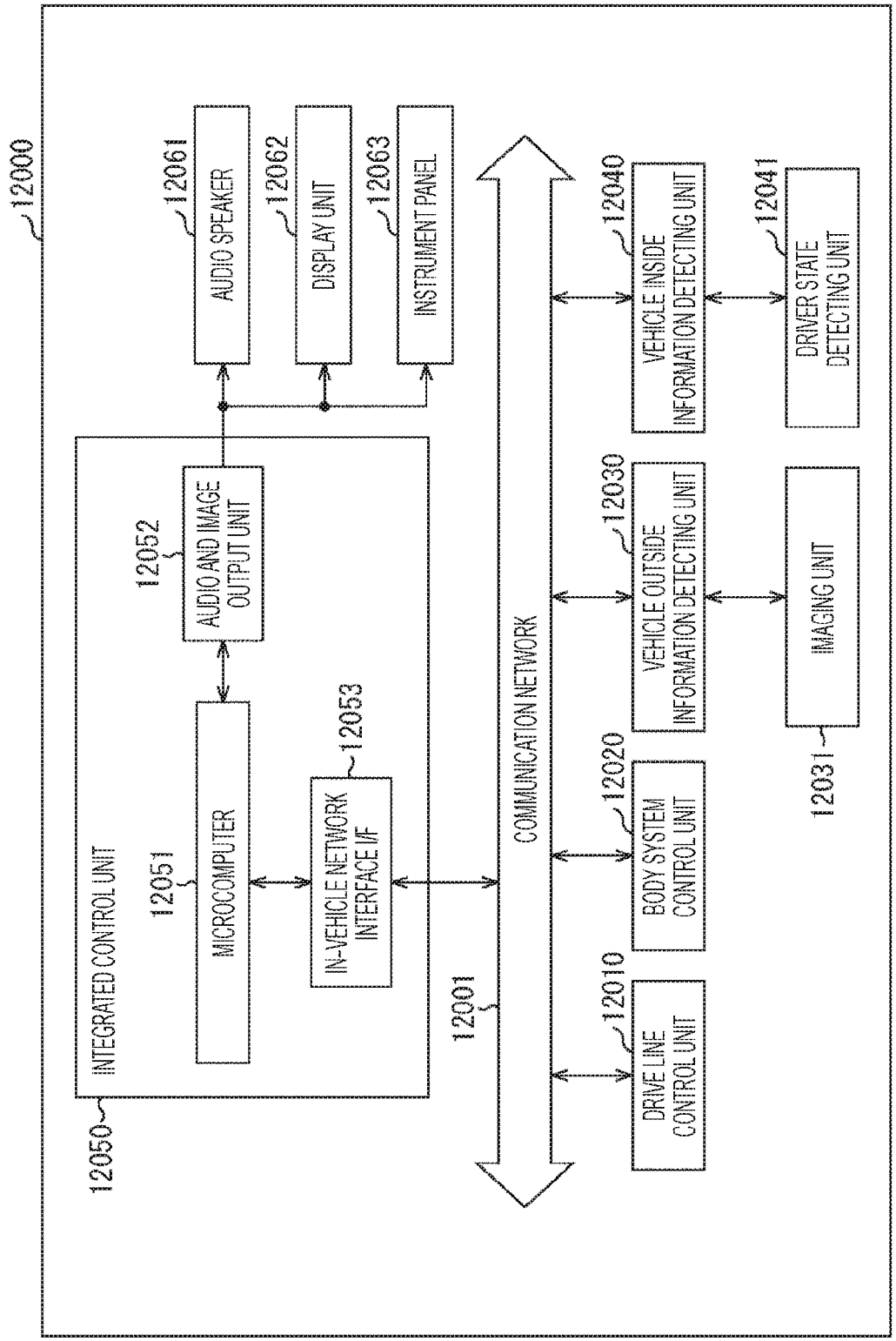
FIG. 22 is a block diagram illustrating a schematic configuration example of a vehicle control system.

FIG. 22 is a block diagram illustrating a schematic configuration example of a vehicle control system, which is an example of a movable body control system to which the technology according to the present disclosure can be applied.

The vehicle control system 12000 includes a plurality of electronic control units connected via a communication network 12001. In the example illustrated in FIG. 22, the vehicle control system 12000 includes a drive line control unit 12010, a body system control unit 12020, a vehicle outside information detecting unit 12030, a vehicle inside information detecting unit 12040, and an integrated control unit 12050. Furthermore, a microcomputer 12051, an audio and image output unit 12052, and an in-vehicle network interface (I/F) 12053 are illustrated as functional configurations of the integrated control unit 12050.

The drive line control unit 12010 controls the operation of apparatuses related to the drive line of the vehicle in accordance with a variety of programs. For example, the drive line control unit 12010 functions as a control apparatus for a driving force generating apparatus such as an internal combustion engine or a driving motor that generates the driving force of the vehicle, a driving force transferring mechanism that transfers the driving force to wheels, a steering mechanism that adjusts the steering angle of the vehicle, a braking apparatus that generates the braking force of the vehicle, and the like.

The body system control unit 12020 controls the operations of a variety of apparatuses attached to the vehicle body in accordance with a variety of programs. For example, the body system control unit 12020 functions as a control apparatus for a keyless entry system, a smart key system, a power window apparatus, or a variety of lights such as a headlight, a backup light, a brake light, a blinker, or a fog lamp. In this case, the body system control unit 12020 can receive radio waves transmitted from a portable device that, serves instead of the key or signals of a variety of switches. The body system control unit 12020 accepts input of these radio waves or signals, and controls the vehicle door lock apparatus, the power window apparatus, the lights, or the like.

The vehicle outside information detecting unit 12030 detects information regarding the outside of the vehicle including the vehicle control system 12000. For example, the imaging unit 12031 is connected to the vehicle outside information detecting unit 12030. The vehicle outside information detecting unit 12030 causes the imaging unit 12031 to capture images of the outside of the vehicle, and receives the captured image. The vehicle outside information detecting unit 12030 may perform processing of detecting an object such as a person, a car, an obstacle, a traffic sign, or a letter on a road, or processing of detecting the distance on the basis of the received image.

The imaging unit 12031 is an optical sensor that receives light and outputs an electric signal corresponding to the amount of received light. The imaging unit 12031 can output the electric signal as the image or output the electric signal as ranging information. Furthermore, the light received by the imaging unit 12031 may be visible light or invisible light such as infrared light.

The vehicle inside information detecting unit 12040 detects information of the inside of the vehicle. The vehicle inside information detecting unit 12040 is connected, for example, to a driver state detecting unit 12041 that detects the state of the driver. The driver state detecting unit 12041 includes, for example, a camera that images a driver, and the vehicle inside information detecting unit 12040 may compute the degree of the driver's tiredness or the degree of the driver's concentration or determine whether or not the driver has a doze, on the basis of detection information input from the driver state detecting unit 12041.

The microcomputer 12051 can calculate a control target value of the driving force generating apparatus, the steering mechanism, or the braking apparatus on the basis of information regarding the inside and outside of the vehicle acquired by the vehicle outside information detecting unit 12030 or the vehicle inside information detecting unit 12040, and output a control instruction to the drive line control unit 12010. For example, the microcomputer 12051 can perform cooperative control for the purpose of executing the functions of the advanced driver assistance system (ADAS) including vehicle collision avoidance or impact reduction, follow-up driving based on the inter-vehicle distance, constant vehicle speed driving, vehicle collision warning, vehicle lane deviation warning, or the like.

Furthermore, the microcomputer 12051 can perform cooperative control for the purpose of automatic: driving or the like for autonomous running without depending on the driver's operation through control of the driving force generating apparatus, the steering mechanism, the braking apparatus, or the like on the basis of information around the vehicle acquired by the vehicle outside information detecting unit 12030 or the vehicle inside information detecting unit 12040.

Furthermore, the microcomputer 12051 can output a control instruction to the body system control unit 12020 on the basis of the information outside the vehicle obtained by the vehicle outside information detecting unit 12030. For example, the microcomputer 12051 can perform the cooperative control for realizing glare protection such as controlling the head light according to a position of a preceding vehicle or an oncoming vehicle detected by the vehicle outside information detecting unit 12030 to switch a high beam to a low beam.

The audio and image output unit 12052 transmits an output signal of at least one of a sound or an image to an output apparatus capable of visually or aurally notifying a passenger of the vehicle or the outside of the vehicle of information. In the example of FIG. 22, an audio speaker 12061, a display unit 12062, and an instrument panel 12063 are exemplified as the output apparatus. For example, the display unit 12062 may include at least one of an onboard display or a head-up display.

Figure 23:
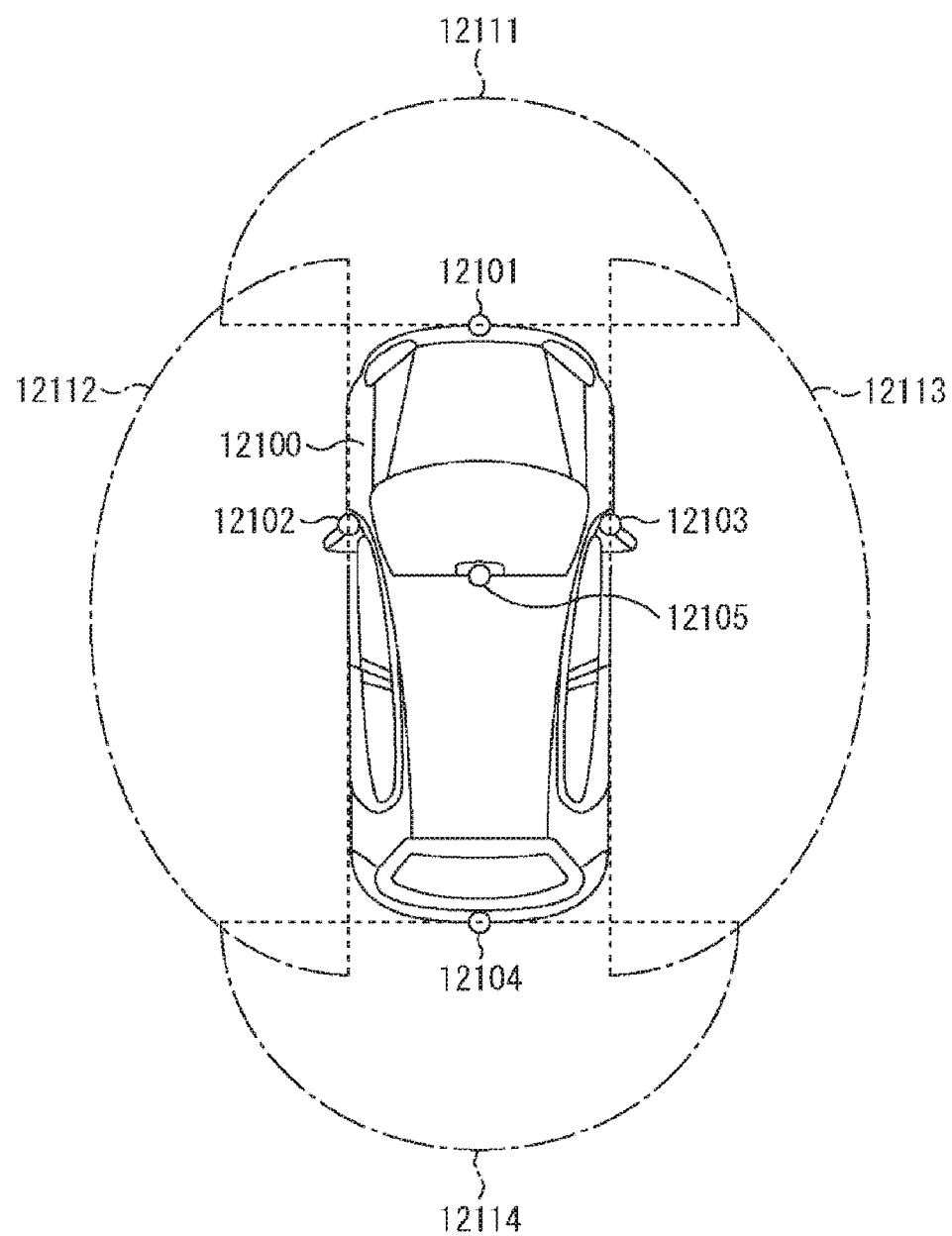
FIG. 23 is an explanatory diagram illustrating an example of an installation position of an imaging unit.

FIG. 23 is a view illustrating an example of an installation position of the imaging unit 12031.

In FIG. 23, imaging units 12101, 12102, 12103, 12104, and 12105 are provided as the imaging unit 12031.

Imaging units 12101, 12102, 12103, 12104 and 12105 are positioned, for example, at the front nose, a side mirror, the rear bumper, the back door, the upper part of the windshield in the vehicle compartment, or the like of a vehicle 12100. The imaging unit 12101 attached to the front nose and the imaging unit 12105 attached to the upper part of the windshield in the vehicle compartment mainly acquire images of the area ahead of the vehicle 12100. The imaging units 12102 and 12103 attached to the side mirrors mainly acquire images of the areas on the sides of the vehicle 12100. The imaging unit 12104 attached to the rear bumper or the back door mainly acquires images of the area behind the vehicle 12100. The imaging unit 12105 attached to the upper part of the windshield in the vehicle compartment is used mainly to detect a preceding vehicle, a pedestrian, an obstacle, a traffic light, a traffic sign, a lane, or the like.

Note that FIG. 23 illustrates an example of the respective imaging ranges of the imaging units 12101 to 12104. An imaging range 12111 represents the imaging range of the imaging unit 12101 attached to the front nose. Imaging ranges 12112 and 12113 respectively represent the imaging ranges of the imaging units 12102 and 12103 attached to the side mirrors. An imaging range 12114 represents the imaging range of the imaging unit 12104 attached to the rear bumper or the back door. For example, overlaying image data captured by the imaging units 12101 to 12104 offers an overhead image that looks down on the vehicle 12100.

At least one of the imaging units 12101 to 12104 may have a function of obtaining distance information. For example, at least one of the imaging units 12101 to 12104 may be a stereo camera including a plurality of image sensors, or may be an image sensor having pixels for phase difference detection.

For example, the microcomputer 12051 may extract especially a closest three-dimensional object on a traveling path of the vehicle 12100, the three-dimensional object traveling at a predetermined speed (for example, 0 km/h or higher) in a direction substantially the same as that of the vehicle 12100 as the preceding vehicle by determining a distance to each three-dimensional object in the imaging ranges 12111 to 12114 and change in time of the distance (relative speed relative to the vehicle 12100) on the basis of the distance information obtained from the imaging units 12101 to 12104. Moreover, the microcomputer 12051 can set an inter-vehicle distance to be secured in advance from the preceding vehicle, and can perform automatic brake control including follow-up stop control), automatic acceleration control (including follow-up start control), and the like. In this manner, it is possible to perform the cooperative control for realizing automatic driving or the like to autonomously travel independent from the operation of the driver.

For example, the microcomputer 12051 can extract three-dimensional object data regarding the three-dimensional object while sorting the data into a two-wheeled vehicle, a regular vehicle, a large vehicle, a pedestrian, and other three-dimensional object such as a utility pole on the basis of the distance information obtained from the imaging units 12101 to 12104 and use the data for automatically avoiding obstacles. For example, the microcomputer 12051 discriminates obstacles around the vehicle 12100 into an obstacle visibly recognizable to a driver of the vehicle 12100 and an obstacle difficult to visually recognize. Then, the microcomputer 12051 determines a collision risk indicating a degree of risk of collision with each obstacle, and when the collision risk is equal to or higher than a set value and there is a possibility of collision, the microcomputer 12051 can perform driving assistance for avoiding the collision by outputting an alarm to the driver via the audio speaker 12061 and the display unit 12062 or performing forced deceleration or avoidance steering via the drive line control unit 12010.

At least one of the imaging units 12101 to 12104 may be an infrared camera for detecting infrared rays. For example, the microcomputer 12051 can recognize a pedestrian by determining whether or not there is a pedestrian in the captured images of the imaging units 12101 to 12104. Such pedestrian recognition is carried out, for example, by a procedure of extracting feature points in the captured images of the imaging units 12101 to 12104 as infrared cameras and a procedure of performing pattern matching processing on a series of feature points indicating an outline of an object to discriminate whether or not the object is a pedestrian. When the microcomputer 12051 determines that there is a pedestrian in the captured images of the imaging units 12101 to 12104 and recognizes the pedestrian, the audio and image output unit 12052 causes the display unit 12062 to superimpose a rectangular contour for emphasis on the recognized pedestrian. Furthermore, the audio and image output unit 12052 may cause the display unit 12062 to display icons or the like indicating pedestrians at desired positions.

An example of the vehicle control system to which the technology according to the present disclosure is applicable is heretofore described. The technology according to the present disclosure can be applied to the imaging unit 12031 and the like among the configurations described above. Specifically, the imaging apparatus 100 illustrated in FIG. 1 can be applied to the imaging unit 12031. "etc). By applying the technology according to the present disclosure to the imaging unit 12031, a captured image that is more viewable can be obtained, and thus driver fatigue can be reduced.

Note that the embodiments described above are examples for embodying the present technology, and matters in the embodiments each have a corresponding relationship with invention-specifying matters in the claims. Similarly, the invention-specifying matters in the claims each have a corresponding relationship with matters in the embodiments of the present technology denoted by the same names. However, the present technology is not limited to the embodiments, and can be embodied by subjecting the embodiments to various variation in the scope without departing from the spirit.

Note that the effects described in the present description are merely illustrative and are not limitative, and other effects may be provided.

Note that the present technology may be configured as below.

(1) A solid-state imaging element including
a first capacitance;
a second capacitance;
a first capacitance connection circuit configured to connect one end of the first capacitance to a first signal line in a case where a first pixel signal is transmitted via the first signal line;
a second capacitance connection circuit configured to connect one end of the second capacitance to a second signal line in a case where a second pixel signal is transmitted via the second signal line; and
an intercapacitance connection circuit configured to connect the one end of each of the first capacitance and the second capacitance in a case where one of the first pixel signal and the second pixel signal is transmitted and disconnect the one end of each of the first capacitance and the second capacitance in a case where both of the first pixel signal and the second pixel signal are transmitted.

(2) The solid-state imaging element according to (1), further including:
a first sample-hold amplifier circuit configured to sample and hold the first pixel signal, amplify the held first pixel signal, and output the amplified first pixel signal via the first signal line; and
a second sample-hold amplifier circuit configured to sample and hold the second pixel signal, amplify the held second pixel signal, and output the amplified second pixel signal via the second signal line.

(3) The solid-state imaging element according to (2), in which
every time one of a plurality of rows each including a predetermined number of pixels arranged in a predetermined direction is selected, one of the first sample-hold amplifier circuit and the second sample-hold amplifier circuit outputs one of the first pixel signal and the second pixel signal.

(4) The solid-state imaging element according to (2) or (3), in which
in a case where the first sample-hold amplifier circuit samples the first pixel signal, the second sample-hold amplifier circuit holds the second pixel signal, and in a case where the first sample-hold amplifier circuit holds the first pixel signal, the second sample-hold amplifier circuit samples the second pixel signal.

(5) The solid-state imaging element according to (2), in which
each of the first pixel signal and the second pixel signal includes a reset level and a signal level.

(6) The solid-state imaging element according to (5), in which
the first sample-hold amplifier circuit and the second sample-hold amplifier circuit, are provided in pairs,
in a case where one of the pair of first sample-hold amplifier circuits samples the reset level of the first pixel signal, the other of the pair of first sample-hold amplifier circuits holds the signal level of the first pixel signal, and in a case where one of the pair of first sample-hold amplifier circuits holds the reset level of the first pixel signal, the other of the pair of first sample-hold amplifier circuits samples the signal level of the first pixel signal, and
in a case where one of the pair of second sample-hold amplifier circuits samples the reset level of the second pixel signal, the other of the pair of second sample-hold amplifier circuits holds the signal level of the second pixel signal, and in a case where one of the pair of second sample-hold amplifier circuits holds the reset level of the second pixel signal, the other of the pair of second sample-hold amplifier circuits samples the signal level of the second pixel signal.

(7) The solid-state imaging element according to (5), in which the first sample-hold amplifier circuit and the second sample-hold amplifier circuit are provided in pairs, the pair of first sample-hold amplifier circuits sequentially samples the reset level and the signal level of the first pixel signal, and the pair of second sample-hold amplifier circuits sequentially samples the reset level and the signal level of the second pixel signal.

(8) The solid-state imaging element according to (5), in which four first sample-hold amplifier circuits and four second sample-hold amplifier circuits are provided, in a case where two of the four first sample-hold amplifier circuits sequentially sample the reset level and the signal level of the first pixel signal, the remaining first sample-hold amplifier circuits hold the reset level and the signal level of the first pixel signal, and in a case where two of the four second sample-hold amplifier circuits sequentially sample the reset level and the signal level of the second pixel signal, the remaining second sample-hold amplifier circuits hold the reset level and the signal level of the second pixel signal.

(9) An imaging apparatus including:

a first capacitance;

a second capacitance;

a first capacitance connection circuit configured to connect one end of the first capacitance to a first signal line in a case where a first pixel signal is transmitted via the first signal line;

a second capacitance connection circuit configured to connect one end of the second capacitance to a second signal line in a case where a second pixel signal is transmitted via the second signal line;

an intercapacitance connection circuit configured to connect the one end of each of the first capacitance and the second capacitance in a case where one of the first pixel signal and the second pixel signal is transmitted and disconnect the one end of each of the first capacitance and the second capacitance in a case where both of the first pixel signal and the second pixel signal are transmitted; and a signal processing unit configured to perform predetermined signal processing on the first pixel signal and the second pixel signal.

(10) A method for controlling a solid-state imaging element, the method including:

a first capacitance connection procedure configured to connect one end of a first capacitance to a first signal line in a case where a first pixel signal is transmitted via the first signal line;

a second capacitance connection procedure configured to connect one end of a second capacitance to a second signal line in a case where a second pixel signal is transmitted via the second signal line; and an intercapacitance connection procedure configured to connect the one end of each of the first capacitance and the second capacitance in a case where one of the first pixel signal and the second pixel signal is transmitted and disconnect the one end of each of the first capacitance and the second capacitance in a case where both of the first, pixel signal and the second pixel signal are transmitted.

REFERENCE SIGNS LIST

100 Imaging apparatus
110 Imaging lens
120 Record unit
130 Imaging control unit
200 Solid-state imaging element
210 Vertical scanning circuit
220 Pixel array unit
230 Pixel
231 Photodiode
232 Transfer transistor
233 Reset transistor
234 Floating diffusion layer
235 Amplification transistor
236 Selection transistor
240 Timing control circuit
250 Load MOS circuit block
251 Load MOS circuit
260 Sample-hold block
261, 281 to 287, 292, 295 Switch
270 Sample-hold circuit
271 to 274, 278 Capacitance
275 Amplifier
276 P-type transistor
277 N-type transistor
280 Sample-hold amplifier circuit
290 Column signal processing unit
291 AD converter
293 Digital CDS circuit
294 Analog CDS circuit
12031 Imaging unit

The invention claimed is:

1. A solid-state imaging element comprising:
a first capacitance;
a second capacitance;
a first sample-hold amplifier circuit configured to sample and hold a first pixel signal, amplify the held first pixel signal, and output the amplified first pixel signal via a first signal line; and
a second sample-hold amplifier circuit configured to sample and hold a second pixel signal, amplify the held second pixel signal, and output the amplified second pixel signal via a second signal line;
a first capacitance connection circuit configured to connect one end of the first capacitance to the first signal line in a case where the amplified first pixel signal is output via the first signal line;
a second capacitance connection circuit configured to connect one end of the second capacitance to the second signal line in a case where the amplified second pixel signal is output via the second signal line; and
an intercapacitance connection circuit configured to connect the one end of each of the first capacitance and the second capacitance in a case where one of the amplified first pixel signal and the amplified second pixel signal is output and disconnect the one end of each of the first capacitance and the second capacitance in a case where both of the amplified first pixel signal and the amplified second pixel signal are output.

2. The solid-state imaging element according to claim 1, wherein every time one of a plurality of rows each including a predetermined number of pixels arranged in a predetermined direction is selected, one of the first sample-hold amplifier circuit and the second sample-hold amplifier circuit outputs one of the amplified first pixel signal and the amplified second pixel signal.

3. The solid-state imaging element according to claim 1, wherein
in a case where the first sample-hold amplifier circuit samples the first pixel signal, the second sample-hold amplifier circuit holds the second pixel signal, and in a case where the first sample-hold amplifier circuit holds the first pixel signal, the second sample-hold amplifier circuit samples the second pixel signal.

4. The solid-state imaging element according to claim 1, wherein
each of the first pixel signal and the second pixel signal includes a reset level and a signal level.

5. The solid-state imaging element according to claim 4, wherein
the first sample-hold amplifier circuit and the second sample-hold amplifier circuit are provided in pairs,
in a case where one of the pair of first sample-hold amplifier circuits samples the reset level of the first pixel signal, the other of the pair of first sample-hold amplifier circuits holds the signal level of the first pixel signal, and in a case where one of the pair of first sample-hold amplifier circuits holds the reset level of the first pixel signal, the other of the pair of first sample-hold amplifier circuits samples the signal level of the first pixel signal, and
in a case where one of the pair of second sample-hold amplifier circuits samples the reset level of the second pixel signal, the other of the pair of second sample-hold amplifier circuits holds the signal level of the second pixel signal, and in a case where one of the pair of second sample-hold amplifier circuits holds the reset level of the second pixel signal, the other of the pair of second sample-hold amplifier circuits samples the signal level of the second pixel signal.

6. The solid-state imaging element according to claim 4, wherein
the first sample-hold amplifier circuit and the second sample-hold amplifier circuit are provided in pairs,
the pair of first sample-hold amplifier circuits sequentially samples the reset level and the signal level of the first pixel signal, and
the pair of second sample-hold amplifier circuits sequentially samples the reset level and the signal level of the second pixel signal.

7. The solid-state imaging element according to claim 4, wherein
four first sample-hold amplifier circuits and four second sample-hold amplifier circuits are provided,
in a case where two of the four first sample-hold amplifier circuits sequentially sample the reset level and the signal level of the first pixel signal, the remaining first sample-hold amplifier circuits hold the reset level and the signal level of the first pixel signal, and
in a case where two of the four second sample-hold amplifier circuits sequentially sample the reset level and the signal level of the second pixel signal, the remaining second sample-hold amplifier circuits hold the reset level and the signal level of the second pixel signal.

8. An imaging apparatus comprising:
a first capacitance;
a second capacitance;
a first sample-hold amplifier circuit configured to sample and hold a first pixel signal, amplify the held first pixel signal, and output the amplified first pixel signal via a first signal line; and
a second sample-hold amplifier circuit configured to sample and hold a second pixel signal, amplify the held second pixel signal, and output the amplified second pixel signal via a second signal line;
a first capacitance connection circuit configured to connect one end of the first capacitance to the first signal line in a case where the amplified first pixel signal is output via the first signal line;
a second capacitance connection circuit configured to connect one end of the second capacitance to the second signal line in a case where the amplified second pixel signal is output via the second signal line;
an intercapacitance connection circuit configured to connect the one end of each of the first capacitance and the second capacitance in a case where one of the amplified first pixel signal and the amplified second pixel signal is output and disconnect the one end of each of the first capacitance and the second capacitance in a case where both of the amplified first pixel signal and the amplified second pixel signal are output; and
a signal processing unit configured to perform predetermined signal processing on the first pixel signal and the second pixel signal.

9. The imaging apparatus according to claim 8, wherein
every time one of a plurality of rows each including a predetermined number of pixels arranged in a predetermined direction is selected, one of the first sample-hold amplifier circuit and the second sample-hold amplifier circuit outputs one of the amplified first pixel signal and the amplified second pixel signal.

10. The imaging apparatus according to claim 8, wherein
in a case where the first sample-hold amplifier circuit samples the first pixel signal, the second sample-hold amplifier circuit holds the second pixel signal, and in a case where the first sample-hold amplifier circuit holds the first pixel signal, the second sample-hold amplifier circuit samples the second pixel signal.

11. The imaging apparatus according to claim 8, wherein
each of the first pixel signal and the second pixel signal includes a reset level and a signal level.

12. The imaging apparatus according to claim 11, wherein
the first sample-hold amplifier circuit and the second sample-hold amplifier circuit are provided in pairs,
in a case where one of the pair of first sample-hold amplifier circuits samples the reset level of the first pixel signal, the other of the pair of first sample-hold amplifier circuits holds the signal level of the first pixel signal, and in a case where one of the pair of first sample-hold amplifier circuits holds the reset level of the first pixel signal, the other of the pair of first sample-hold amplifier circuits samples the signal level of the first pixel signal, and
in a case where one of the pair of second sample-hold amplifier circuits samples the reset level of the second pixel signal, the other of the pair of second sample-hold amplifier circuits holds the signal level of the second pixel signal, and in a case where one of the pair of second sample-hold amplifier circuits holds the reset level of the second pixel signal, the other of the pair of second sample-hold amplifier circuits samples the signal level of the second pixel signal.

13. The imaging apparatus according to claim 11, wherein
the first sample-hold amplifier circuit and the second sample-hold amplifier circuit are provided in pairs,
the pair of first sample-hold amplifier circuits sequentially samples the reset level and the signal level of the first pixel signal, and the pair of second sample-hold amplifier circuits sequentially samples the reset level and the signal level of the second pixel signal.

14. The imaging apparatus according to claim 11, wherein four first sample-hold amplifier circuits and four second sample-hold amplifier circuits are provided, in a case where two of the four first sample-hold amplifier circuits sequentially sample the reset level and the signal level of the first pixel signal, the remaining first sample-hold amplifier circuits hold the reset level and the signal level of the first pixel signal, and in a case where two of the four second sample-hold amplifier circuits sequentially sample the reset level and the signal level of the second pixel signal, the remaining second sample-hold amplifier circuits hold the reset level and the signal level of the second pixel signal.

15. A method for controlling a solid-state imaging element that includes a first capacitance, a second capacitance, a first sample-hold amplifier circuit, a second sample-hold amplifier circuit, a first capacitance connection circuit, a second capacitance connection circuit and an intercapacitance connection circuit, the method comprising:

by the first sample-hold amplifier circuit, sampling and holding a first pixel signal, amplifying the held first pixel signal, and outputting the amplified first pixel signal via a first signal line;

by the second sample-hold amplifier circuit, sampling and holding a second pixel signal, amplifying the held second pixel signal, and outputting the amplified second pixel signal via a second signal line;

connecting, by the first capacitance connection circuit, one end of the first capacitance to the first signal line in a case where the amplified first pixel signal is output via the first signal line;

connecting, by the second capacitance connection circuit, one end of the second capacitance to the amplified second signal line in a case where a second pixel signal is output via the second signal line; and connecting, by the intercapacitance connection circuit, the one end of each of the first capacitance and the second capacitance in a case where one of the amplified first pixel signal and the amplified second pixel signal is output and disconnecting the one end of each of the first capacitance and the second capacitance in a case where both of the amplified first pixel signal and the amplified second pixel signal are output.

* * * * *